(12) United States Patent
Tsukagoshi et al.

(10) Patent No.: US 6,424,792 B1
(45) Date of Patent: *Jul. 23, 2002

(54) SUBTITLE ENCODING/DECODING METHOD AND APPARATUS

(75) Inventors: Ikuo Tsukagoshi; Noriyuki Yamashita, both of Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,400

(22) Filed: Oct. 5, 1998

Related U.S. Application Data

(63) Continuation of application No. 08/686,192, filed on Jul. 24, 1996, now Pat. No. 5,848,217.

(30) Foreign Application Priority Data

Aug. 2, 1995 (JP) .............................................. 7-215506

(51) Int. Cl.[7] ................................................. H04N 5/76
(52) U.S. Cl. ............................. 386/95; 386/98; 386/111
(58) Field of Search .............................. 386/1, 6–8, 45, 386/68, 69, 70, 81–82, 95, 98, 125, 126, 111, 112; 360/18, 19, 20, 40, 48, 27; 348/232, 233; 358/906; 434/307 A

(56) References Cited

U.S. PATENT DOCUMENTS

| | | | | |
|---|---|---|---|---|
| 5,574,569 A | * | 11/1996 | Utsumi et al. | ................. 386/95 |
| 5,596,564 A | * | 1/1997 | Fukushima et al. | ......... 386/125 |
| 5,721,720 A | * | 2/1998 | Kikuchi et al. | ............. 386/126 |
| 5,848,217 A | * | 12/1998 | Tsukagoshi et al. | .......... 386/95 |
| 6,104,861 A | * | 8/2000 | Tsukagoshi | ................... 386/95 |

* cited by examiner

*Primary Examiner*—Thai Tran
(74) *Attorney, Agent, or Firm*—Frommer Lawrence & Haug LLP; William S. Frommer; Gordon Kessler

(57) ABSTRACT

Subtitle searching is achieved by encoding a subtitle to be displayed exclusively during a trick playback mode. Addresses for the subtitle to be played back during the trick playback mode are stored on a record medium reserved for addresses. A computer-readable memory directs a computer to retrieve these addresses and locate subtitles to be displayed during the trick playback mode on the record medium. The subtitles are searched by decoding and displaying the subtitles located at the addresses on the record medium to be displayed during the trick playback mode.

29 Claims, 20 Drawing Sheets

Player internal block diagram

FIG. 3A

Table of contents in CD

| subcode frame # | POINT | PMIN, PSEC, PFRAME |
|---|---|---|
| N | x x x x x x x | xx, yy, zz |
| N+1 | x x x x x x x | xx, yy, zz |
| N+2 | x x x x x x x | xx, yy, zz |
| N+3 | x x x x x x x | xx, yy, zz |

(A)

Table of contents

| STREAM | FRAME | START_SECTOR_ADDRESS | END_SECTOR_ADDRESS |
|---|---|---|---|
| video | V | x x x x x x x x | x x x x x x x x |
| | V+1 | x x x x x x x x | x x x x x x x x |
| | V+2 | x x x x x x x x | x x x x x x x x |
| | V+3 | x x x x x x x x | x x x x x x x x |
| audio | A | x x x x x x x x | x x x x x x x x |
| | A+1 | x x x x x x x x | x x x x x x x x |
| | A+2 | x x x x x x x x | x x x x x x x x |
| subtitle | S | x x x x x x x x | x x x x x x x x |
| | S+1 | x x x x x x x x | x x x x x x x x |
| | S+2 | x x x x x x x x | x x x x x x x x |

Table of contents

| STREAM | FRAME | START_SECTOR_ADDRESS | END_SECTOR_ADDRESS | DURATION |
|---|---|---|---|---|
| video | V | xxxxxxxx | xxxxxxxx | |
| | V+1 | xxxxxxxx | xxxxxxxx | |
| | V+2 | xxxxxxxx | xxxxxxxx | |
| | V+3 | xxxxxxxx | xxxxxxxx | |
| audio | A | xxxxxxxx | xxxxxxxx | |
| | A+1 | xxxxxxxx | xxxxxxxx | |
| | A+2 | xxxxxxxx | xxxxxxxx | |
| subtitle | S | xxxxxxxx | xxxxxxxx | dddd |
| | S+1 | xxxxxxxx | xxxxxxxx | dddd |
| | S+2 | xxxxxxxx | xxxxxxxx | dddd |

(C)

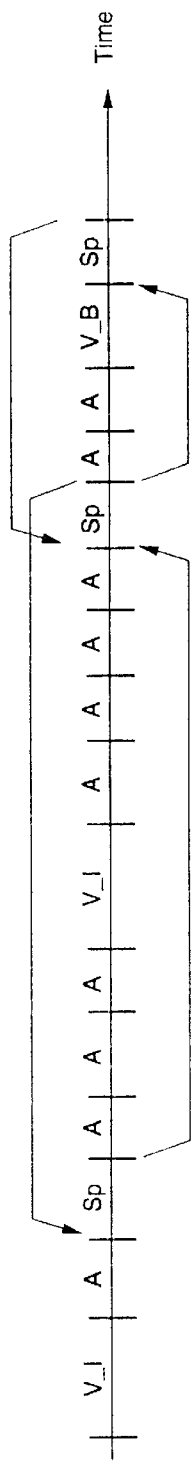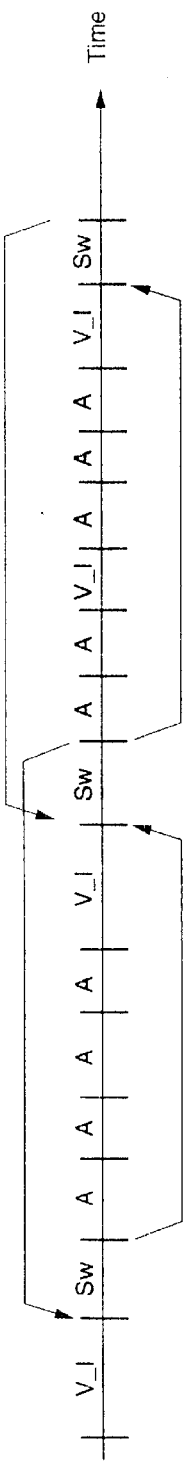
FIG. 4A with normal mode stream
FIG. 4B with trick mode stream
V_I : intra video picture
V_P : differential picture
V_B : bidirectional differential picture
A : audio
Sw : subtitle whole page
Sp : subtitle divided page

FIG. 5

(1) from system controller 14

| | bits | | |
|---|---|---|---|
| reset | 1 | system reset | |
| buffer clear | 1 | error in code data, instruction from system controller to throw away data | max30Hz |
| decode start | 1 | decode start (start of code buffer read) | max30Hz |
| stream_select | 5 | designate stream including identification of normal playback/special playback | static |
| ch_select | 5 | decode channel designation | static |
| special | 1 | special playback | as it happens |
| repeat time | 8 | display time during special playback | as it happens |
| xsqueeze | 1 | during 16:9 monitor use | static |
| on/off | 1 | subtitles superimpose on/off | static |
| u_position | 8 | user designated display position (screen vertical direction) | static |

(2) to system controller 14

| | bits | | |
|---|---|---|---|
| PTSS | 33 | time stamp for subtitle display time | max30Hz |
| buffer overflow | 1 | two banks of data present within the buffer | max30Hz |
| buf write term | 1 | writing of data for one bank completed | max30Hz |
| header error | 1 | error in header | max30Hz |
| data error | 1 | error in data | max30Hz |
| special_ack | 1 | ACK for special playback | as it happens |
| repeat | 8 | display time (both normal and special) | max30Hz |
| V. position | 8 | display position at time of encoding | max30Hz |
| fade factor | 4 | fade-in/out time | max30Hz |

FIG. 6

(1)(2) : 8bit bus+4bit select+1bit I/O
other : real signal bits

| (3) from generator | bits |
|---|---|
| H sync | 1 |
| V sync | 1 |
| 13.5Mbz clock | 1 |

| (4) from demux | |
|---|---|
| data stream | 8 |
| strobe | 1 |
| error | 1 |

| (5) to code buffer | |
|---|---|
| address | 15 |
| data | 8 |
| xce | 1 |
| xwe | 1 |
| xoe | 1 |

| (6) from video decoder | |
|---|---|
| video data (4 : 2 : 2) | 16 |

| (7) to DAC | |
|---|---|
| video data (4 : 2 : 2) | 16 |

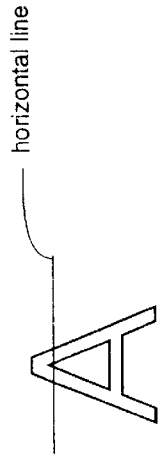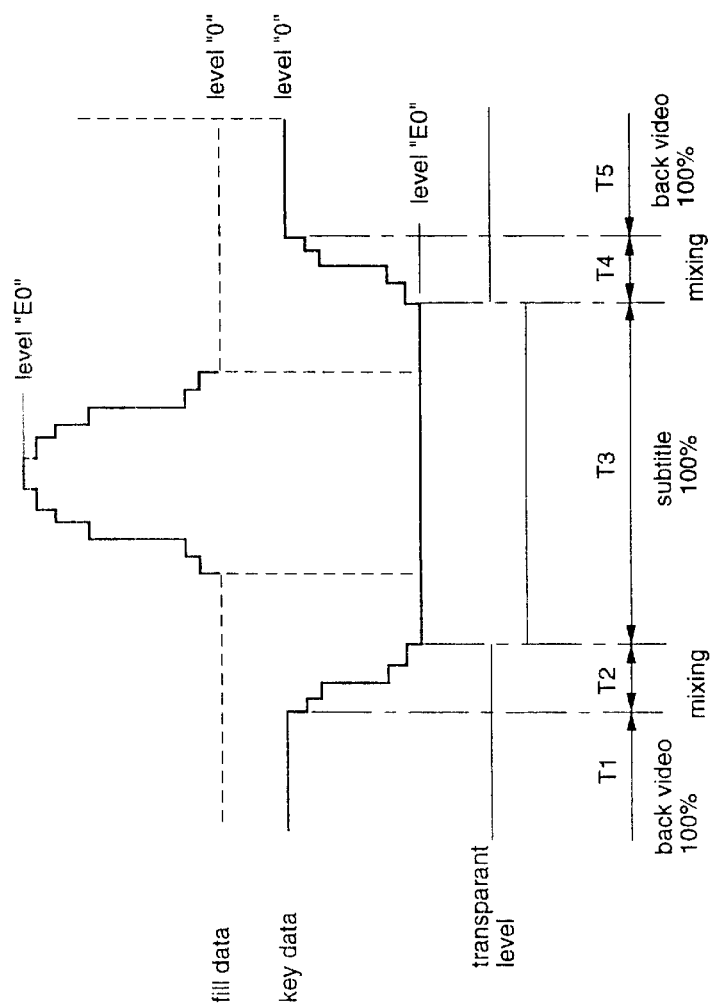
FIG. 7A
FIG. 7B
FIG. 7C

FIG. 8

| Addr | Y | Cr | Cb | K |
|---|---|---|---|---|
| 0 | 00 | 7F | 7F | 00 |
| 1 | 00 | 7F | 7F | 20 |
| 2 | 00 | 7F | 7F | 40 |
| . | | | | |
| . | | | | |
| 6 | 00 | 7F | 7F | C0 |
| 7 | 00 | 7F | 7F | E0* |
| 8 | 00 | 7F | 7F | E0 |
| 9 | 20 | 7F | 7F | E0 |
| . | | | | |
| . | | | | |
| E | C0 | 7F | 7F | E0 |
| F | E0 | 7F | 7F | E0 |

\*E0 : subtitle data 100%
: video data 0%

FIG. 11

Color Look Up Table

| Addr | Y  | Cr | Cb | K  |
|------|----|----|----|----|
| 0    | 00 | 7F | 7F | 00 |
| 1    | 20 | 7F | 7F | 40 |
| 2    | 40 | 7F | 7F | 80 |
| 3    | 60 | 7F | 7F | C0 |
| 4    | 80 | 7F | 7F | F0 |
| 5    | A0 | 7F | 7F | F0 |
| 6    | C0 | 7F | 7F | F0 |
| 7    | E0 | 7F | 7F | F0 |
| 8    | 00 | FF | FF | 00 |
| 9    | 20 | FF | FF | 40 |
| A    | 40 | FF | FF | 80 |
| B    | 60 | FF | FF | C0 |
| C    | 80 | FF | FF | F0 |
| D    | A0 | FF | FF | F0 |
| E    | C0 | FF | FF | F0 |
| F    | E0 | FF | FF | F0 |

Subtitle decoder buffer model

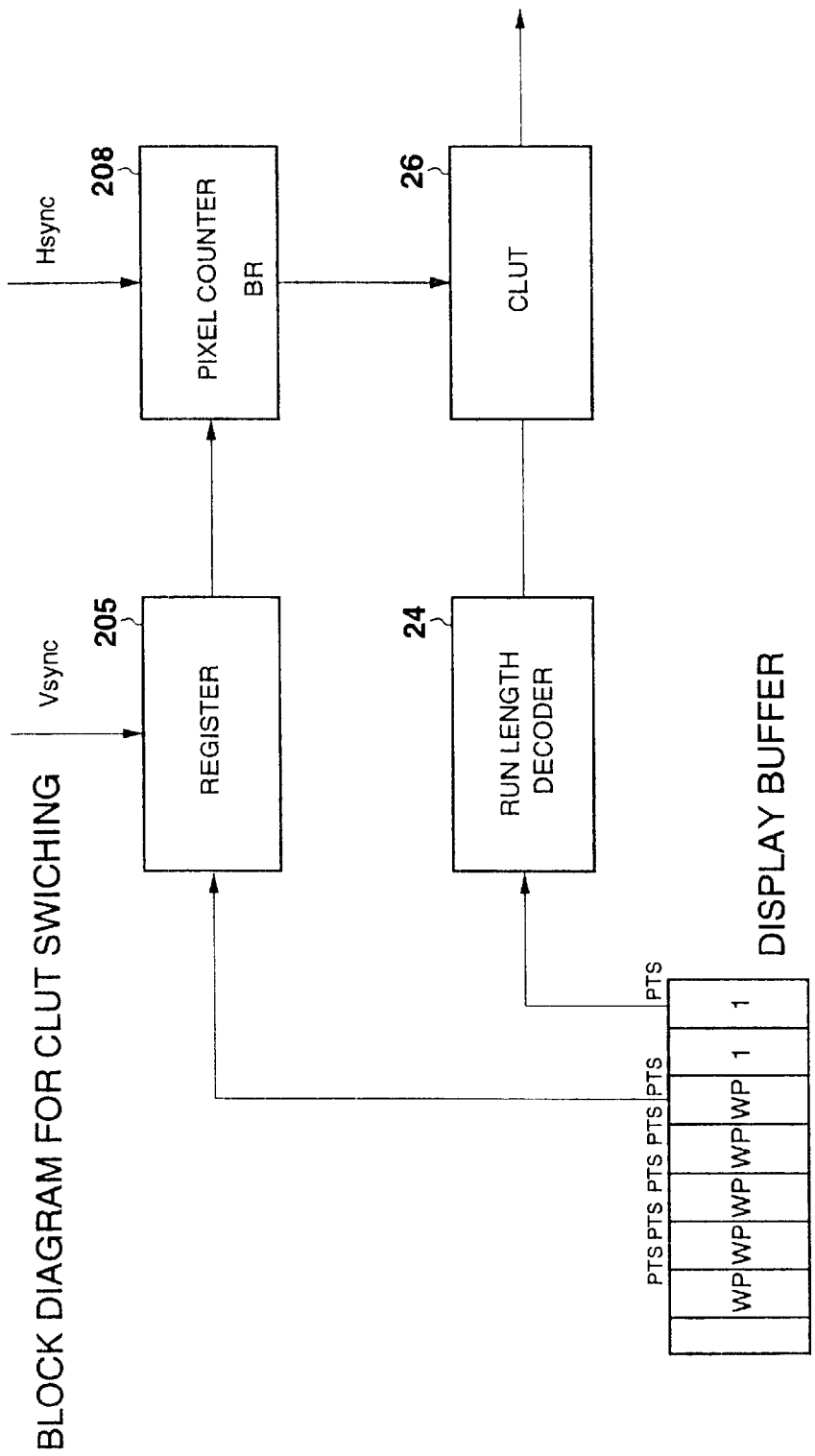

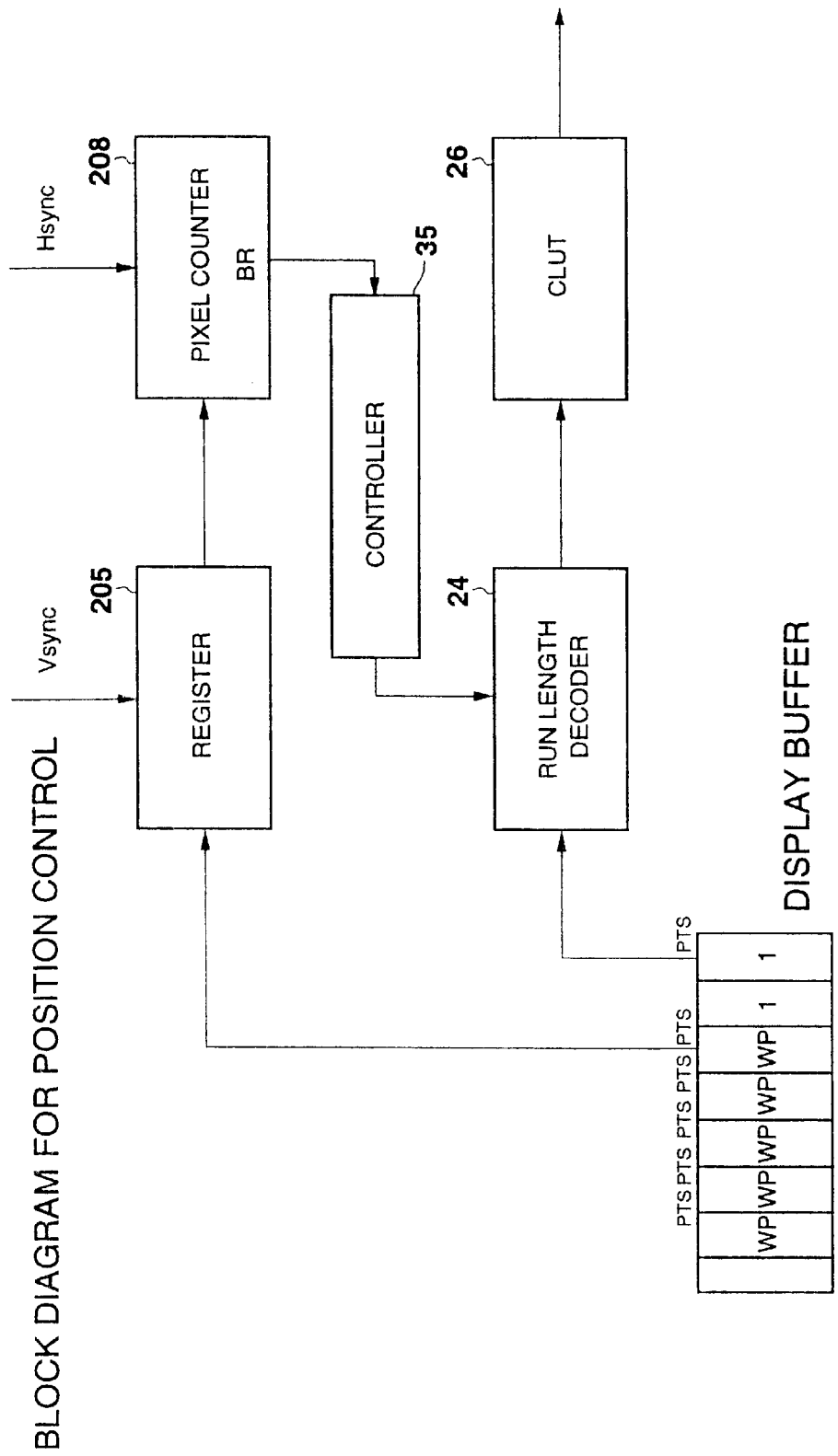

1Block → 75Hz
1Frame → 75×98Hz
subcode bit rate=7.35kBytes/s transfer format

SUBTITLE ENCODING/DECODING METHOD AND APPARATUS

This is a continuation application of prior application Ser. No. 08/686,192 filed on Jul. 24, 1996, now U.S. Pat. No. 5,845,117.

BACKGROUND OF THE INVENTION

The present invention relates to encoding and decoding subtitles and, more particularly, to searching for subtitles on a record medium.

Television broadcasting or video reproduction (such as from a video disk) provides subtitles superimposed on the video image. Problematically, the subtitles are permanently combined with the underlying video image and cannot be manipulated at the receiving (or reproducing) end. The subtitles, for example, cannot be searched for information concerning a specific scene occurring in the video image or sound in its corresponding audio track.

Compact Disc Graphics (CD-G) provide some flexibility in searching subtitles because this technique records graphics in the form of subcodes. However, CD-G has a serious disadvantage because this technique is limited to compact disc (CD) applications, which are slow by television standards. That is, the CD-G technique does not lend itself to manipulation of subtitles in real-time television broadcasts or video reproductions.

As will be shown with reference to FIGS. 18A–C and 19, the lead time required to generate a full CD-G screen is grossly inadequate for normal television or video broadcasts. FIG. 18A depicts the CD-G data format in which one frame includes 1 byte of a subcode and 32 bytes of audio channel data, 24 bytes of which are allocated for L and R audio channel data (each channel having 6 samples with 2 bytes per sample) and 8 bytes allocated to an error correction code. The frames are grouped as a block of 98 frames (Frame 0, Frame 1, ..., Frame 96 and Frame 97) as shown in FIG. 18B and eight of these blocks P,Q,R,S,T,U,V and W are transmitted as shown in FIG. 18C. The subcodes for Frames 0 and 1 in each block are reserved for sync patterns S1, S1, whereas the subcodes for the remaining 96 frames are reserved for various subcode data. The first two blocks P, Q are allocated to search data employed for searching through record tracks, while the remaining 6 blocks R,S,T, U,V and W are available for graphic data.

CD-G transmits each block of 98 frames at a repeating frequency of 75 Hz. Thus, the data transmission rate for 1 block is (75 Hz×98 bytes)=7.35 kHz, resulting in a subcode bit rate of 7.35 K bytes/s.

The transmission format for transmitting the information present in blocks R,S,T,U,V and W is shown in FIG. 19, wherein each of the 96 frames (2,3, ... 97) of the 6 blocks (R,S,T,U,V and W) is transmitted as a packet including 6 channels (R to W) of 96 symbols per channel. The packet is further subdivided into 4 packs of 24 symbols apiece (symbol 0 to symbol 23), with each pack storing a CD-G character. It will be appreciated that, a CD-G character is made up of 6×12 pixels and, therefore, is easily accommodated in each 6×24 pack. According to the CD-G format, the 6×12 CD-G character is stored in the six channels of (R,S,T,U,V and W) at symbols 8 to 19 (12 symbols). The remainder of the symbols in each of the packs store information about the character.

Mode information is one example of information stored in the packs and is stored in the first 3 channels (R, S, T) of symbol 0 in each pack. Item information is another example which is stored in the last 3 channels (U, V, W) of symbol 0. A combination of the mode information and the item information defines the mode for the characters stored in the corresponding pack as follows:

TABLE 1

| Mode | Item |
| --- | --- |
| 000 | 000 0 mode |
| 001 | 000 graphics mode |
| 001 | 001 TV-graphics mode |
| 111 | 000 user's mode |

An instruction is another example of information stored in the packs and is stored in all of the channels of symbol 1. Corresponding mode, item, parity or additional information for the instruction is stored in all of the channels of symbols 2 to 7. Parity information for all of the data in the channels of symbols 0 to 19 is stored in all of the channels of the last 4 symbols (symbols 20 to 23) of each pack.

As discussed, the CD-G system is slow. The CD-G data is transmitted at a repeating frequency of 75 Hz and, therefore, a packet which contains 4 packs is transmitted at a rate of 300 packs per second (75 Hz×4 packs). That is, with 1 character allocated to the range of 6×12 pixels, 300 characters can be transmitted in 1 second. However, a CD-G screen is defined as 288 horizontal picture elements×192 CD-G vertical picture elements and requires more than twice the 300 characters transmitted in 1 second. The total transmission time for a 288×192 screen is 2.56 seconds as shown by the following equation:

$$(288/6) \times (192/12) \div 300 = 2.56 \text{ seconds}$$

With the CD-G system, searching for a specific event (such as a scene) would be extremely time consuming because the time to regenerate each screen (2.56 seconds) by itself is extremely long, when it is considered that screens are usually refreshed in tenths of a second. This problem is compounded when hexadecimal codes are used for the characters because each hexadecimal expression requires 4 bits to represent 1 pixel. As a result, 4 times the data described above is transmitted, thereby increasing the transmission rate to 10.24 seconds (4×2.56 seconds). Since each screen requires a sluggish 10.24 seconds for transmission, a continual transmission of screens means that a lag time of 10.24 seconds is experienced when transmitting screens using the CD-G technique.

In one type of system (known as the CAPTAIN system), dot patterns, as well as character codes, represent the subtitles. This system, however, does not appear to be significantly better than the CD-G system and suffers from some of the same disadvantages. That is, both systems lack the capability to search for a specific event efficiently. In addition, these systems do not provide subtitles with sufficient resolution power in displaying the subtitles. The CD-G system designates only 1 bit for each pixel, and this binary pixel data creates undesired aliasing and flicker. The CAPTAIN system, for example, is developed for a 248 (horizontal picture elements) by 192 (vertical picture elements) display, i.e., a low resolution display, and not for high resolution video pictures of 720×480.

OBJECTS OF THE INVENTION AND SUMMARY OF THE INVENTION

An objective of the invention, therefore, is to provide an encoding method and apparatus for encoding subtitles to be played back exclusively during the trick playback mode, i.e., during fast, slow or reverse playback modes.

Another object of the invention is to provide a computer-readable memory for directing a computer to search the subtitles stored in the memory.

An even further object of the invention is to provide a decoding method and apparatus for decoding the subtitles to be displayed during the trick playback mode.

In accordance with the above objectives, the present invention provides an encoding method and apparatus which encodes a first subtitle to be displayed during the normal playback mode and writes a corresponding first address to the record medium in an area reserved for such addresses. A second subtitle to be displayed in a respective video frame in place of the first subtitle is encoded onto the record medium at a corresponding address in the area reserved for such addresses.

The present invention further provides a computer-readable memory for directing a computer to playback a subtitle to be displayed during a trick playback mode by pointing the computer to addresses of subtitles to be displayed in the trick playback mode.

The present invention further provides a decoding method and apparatus which decodes the subtitles to be displayed exclusively during the trick playback mode by reading out the subtitle from a subtitle address stored on the record medium.

BRIEF DESCRIPTION OF THE DRAWINGS

A more complete appreciation of the present invention and many of its attendant advantages will be readily obtained by reference to the following detailed description considered in connection with the accompanying drawings, in which:

FIGS. 3A and 3B are tables of addresses according to the present invention;

FIGS. 4A and 4B is a diagram depicting subtitle search operation in normal and trick playback modes;

FIG. 5 is a table of communications between the system controller of FIG. 1 and the controller of FIG. 2;

FIG. 6 is a table of parameters for the communications between components of FIG. 1 and FIG. 2;

FIGS. 7A to 7C are signal diagrams demonstrating data encoding of the present invention;

FIG. 8 is a color look up table referred to when encoding subtitle data;

FIG. 11 is a color look up table referred to when conducting a color wipe operation;

FIG. 15 is a block diagram depicting the colorwiping operation according to FIGS. 14A to 14C;

FIG. 17 is a block diagram depicting a circuit for the dynamic positioning operation according to FIGS. 16A to 16C;

DETAILED DESCRIPTION OF THE PREFERRED EMBODIMENTS

Figure 1:
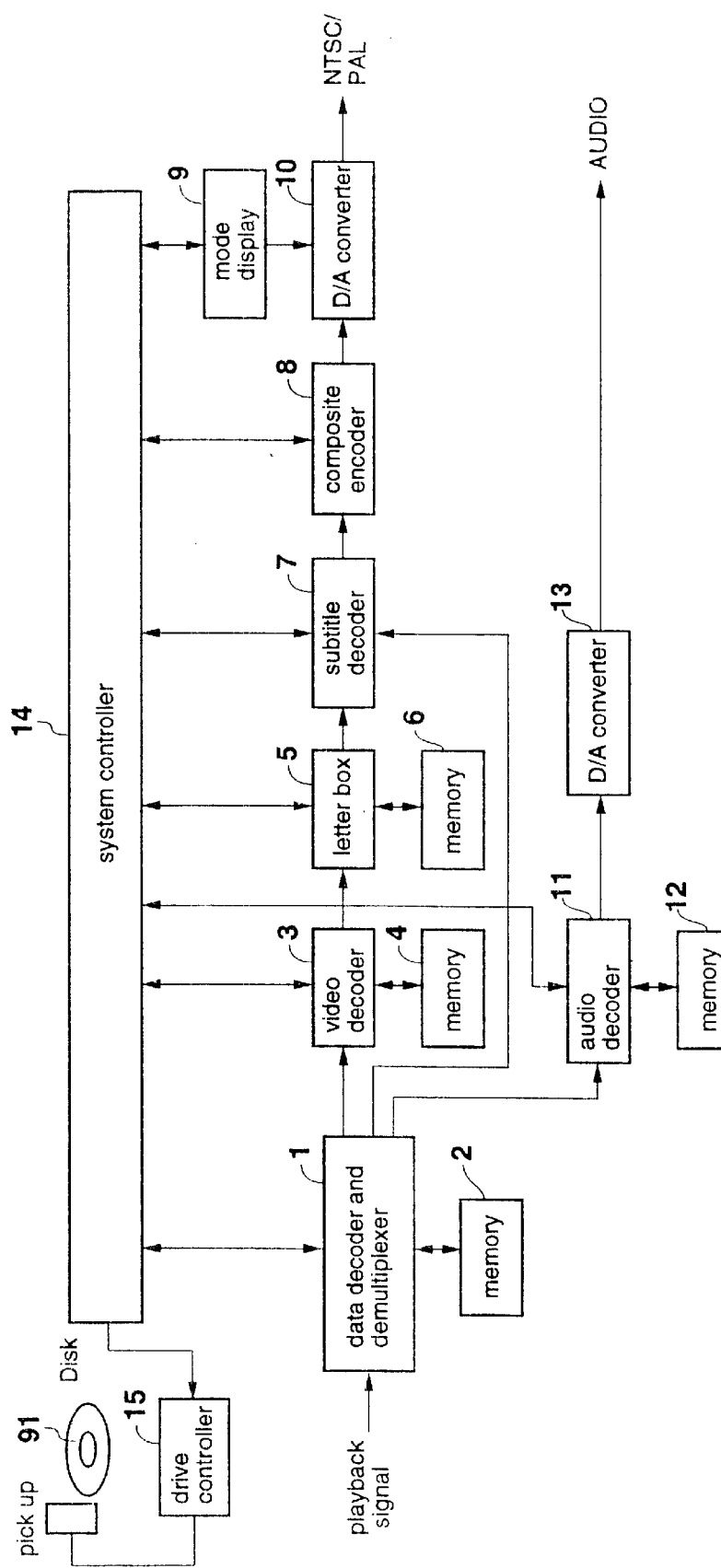
FIG. 1 is a block diagram of a data decoding apparatus of the present invention.

Referring now to the drawings, wherein like reference numerals designate identical or corresponding parts throughout, the present invention will be described.

Decoding Apparatus

The data decoding apparatus shown in FIG. 1 incorporates the present invention and operates to decode a reproduced signal. A system controller 14 of the data decoding apparatus causes the signal reproduced from, for example, a disk 91, to be processed and sent to a subtitle decoder 7. The system controller communicates with a controller 35 (FIG. 2) of the subtitle decoder to decode the subtitles and superimpose them onto a decoded video image for display on a television screen.

A data decoder and demultiplexer 1 receives a digital signal reproduced from, for example, a disk, a VCR, or the like. The data decoder and demultiplexer error decodes the reproduced signal, preferably employing an Error Correcting Code (ECC) technique, and demultiplexes the error decoded reproduced signal into video, subtitle and audio data streams. A memory 2 may be used, for example, as a buffer memory as a work area for the purpose of error decoding and demultiplexing the reproduced signal.

A video decoder 3 decodes the demultiplexed video data from a video data stream. A memory 4 may be employed for the operation of decoding the video data similar to the operation of the memory 2 employed with data decoder and demultiplexer 1.

A letter box circuit 5 converts the decoded video data with a 4:3 aspect ratio to a 16:9 aspect ratio. The conversion is performed using a 4 to 3 decimation process, whereby every four horizontal lines are decimated to three horizontal lines, thus squeezing the video picture into a ¾ picture. According to the letter box format, a vertical resolution component is derived from the remaining ¼ of the video picture and is employed to enhance the vertical resolution of the decimated video picture. A timing adjustment memory 6 times the transmission of the video picture to ensure that the ¼ of the letter box picture is not transmitted. When the decoded video data generated by the video decoder 3 is already in a 16:9 letter box format, the letter box circuit bypasses the decimation operation and sends the decoded video data directly to subtitle decoder 7.

The decoded subtitle data demultiplexed by the data decoder and demultiplexer 1 is sent directly to subtitle decoder 7 which decodes the subtitle data according to instructions from system controller 14 and mixes the decoded subtitle data with the decoded video data.

A composite encoder 8 encodes the mixed subtitle data and video data into a suitable video picture format, such as NTSC, PAL or the like. A mode display 9 interfaces with a user and indicates, for example, the mode of a television monitor connected to the illustrated apparatus. A D/A converter 10 converts the encoded signal received from the composite encoder into an analog signal suitable for display in the indicated mode, such as NTSC or PAL.

The audio portion of the audio/video signal decoded by the data decoder and demultiplexer 1 is decoded by an audio decoder 11 which decodes the demultiplexed audio data using a memory 12, for example. The decoded audio data output from the audio decoder is converted into an analog audio signal appropriate for reproduction by a television monitor by a D/A converter 13.

Subtitle Decoder

Subtitle decoder 7, as will be discussed with reference to FIG. 2, decodes the encoded subtitle data and mixes the decoded subtitle data with the appropriate video data. Controller 35 (FIG. 2) controls the operations of the subtitle decoder and communicates with the system controller 14 of the decoder (FIG. 1) using the command signals shown in FIG. 2 (as listed in FIG. 5). Together, the controller 35 and system controller 14 time the decoding of the subtitle data so that the subtitle data is mixed with video image data at the proper position whereat the subtitles are to appear on the video image.

A word detector 20 of the subtitle decoder receives the subtitle data in groups of bit streams reproduced from a disk, the bit streams being stored on the disk in packets. Each group of bit streams makes up one frame (or page) of subtitles to be superimposed on a video image. Different groups of bit streams may represent subtitles displayed in different playback modes, such as normal playback, fast-reverse or fast-forward, alternatively referred to as trick modes. The system controller indicates to the word detector using a stream_select signal which playback mode is to be adopted for display and the word detector selects the appropriate bit stream of signals for the indicated playback mode. In the case where different video images are displayed on different channels, the system controller indicates the appropriate channel to the word detector correspondingly in a ch_select signal and the word detector changes channels to receive only those bit streams on the selected channel.

A group of bit streams making up one frame and received by the word detector includes page header information (s.header) which describes the format of the group of bit streams. The page header information is accompanied by header error information (header error) and data error information (data error). The system controller uses the page header information to determine how to parse the group of bit streams and extract the relevant subtitle data therefrom. The system controller uses the header error information to correct anomalies in the page header information and uses the data error information to correct anomalies in the subtitle data.

The word detector forwards the subtitle data (Bitmap) along with other decoded information (including a presentation time stamp PTS, position data position_data and color look up table data CLUT_data) to a code buffer 22. The PTS is a signal that indicates the precise time when the audio, video and subtitle data for a frame is transmitted so that the system controller knows when to demultiplex the data from the reproduced signal. The position data indicates the horizontal and vertical position where the subtitles are to be superimposed on the video image. The CLUT_data indicates which colors are to be used for the pixels making up the subtitles. For example, the system controller 14 determines that a video image is being displayed and sends the subtitle data to subtitle decoder 7 at the time indicated by the time stamp (PTS) and causes the subtitle decoder to output the corresponding subtitle data (Bitmap) at a position in the video image represented by the horizontal and vertical position indicated by the position_data in the color indicated by the CLUT_data.

Figure 2:
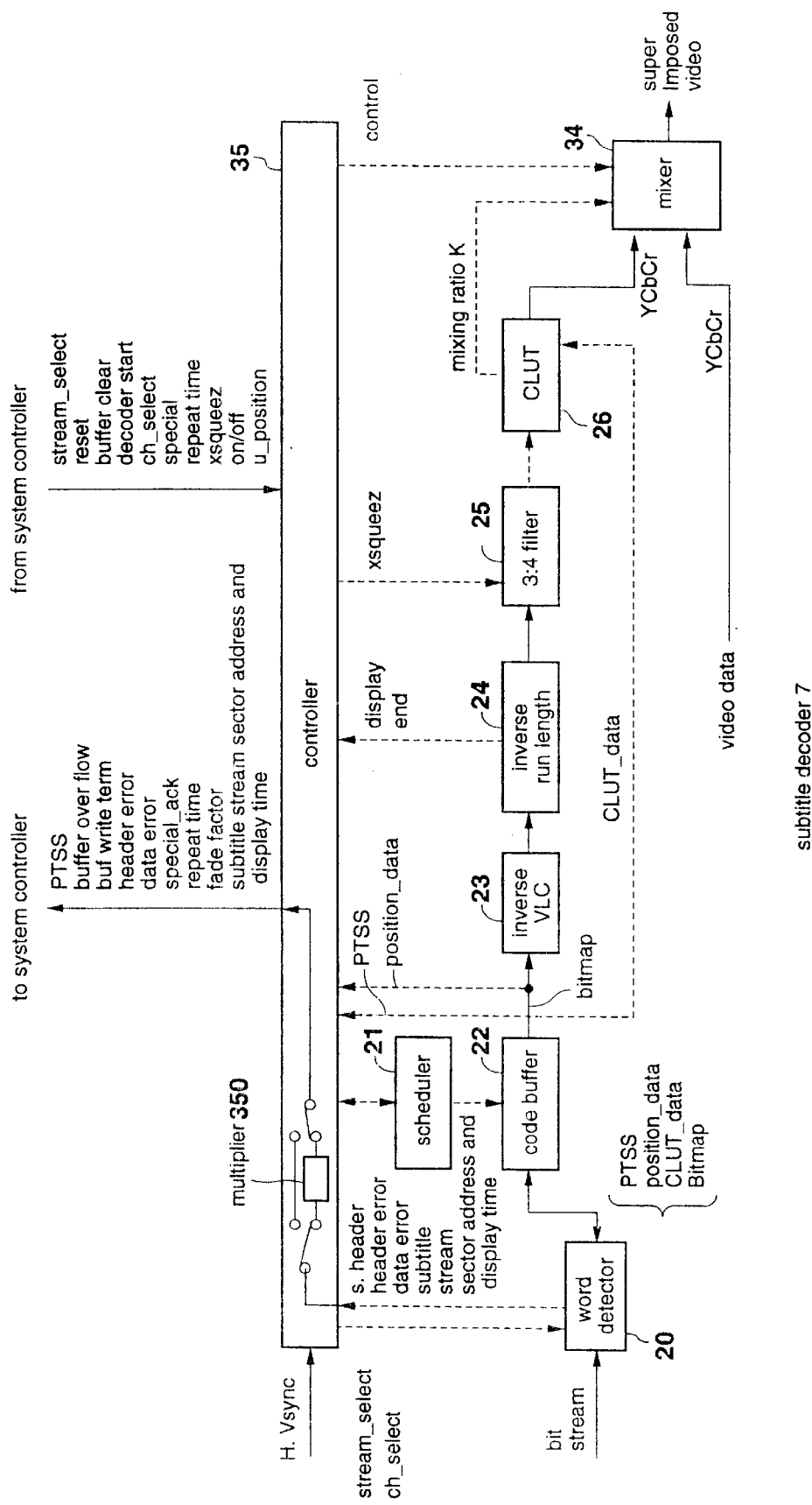
FIG. 2 is a block diagram of the subtitle decoder depicted in FIG. 1.

The word detector also detects display time data and forwards this data to the system controller (FIG. 1) via multiplier 350 of controller 35 (FIG. 2). This display time data is read from the page header information of a group of bit streams comprising one page (i.e., a frame) of subtitle data. The display time data indicates a time duration in which the subtitle encoded in the page is to be displayed with a respective video frame during a normal playback mode. When, for example, the system controller (FIG. 1) indicates with the special signal to controller 35 that the system is in normal playback mode, the controller causes the multiplier to be bypassed and the display time data is forwarded directly to the system controller. In the case where the special signal indicates a special (trick playback) mode, the controller causes the display time data to be switched to the multiplier and the display time data is factored before being forwarded to the system controller. It will be appreciated that the display times stored with the trick mode subtitles are for the normal playback mode because it is unknown in advance which playback speed the viewer will select and that these display times are modified by the controller for different playback speeds.

By factoring the display time data, the time duration for display of the subtitle in a trick playback mode is varied. This is particularly advantageous when the display time for a subtitle is, for example, longer than the time duration of display for a video frame in trick playback mode. In that situation, displaying the subtitle for a duration equal to the unmodified display time would undesirably result in the subtitle being displayed in the trick playback mode for a longer duration than the respective video frame is displayed. In other situations, it may be desirable to extend the duration of subtitle display beyond a single video frame when, for example, a subtitle to be displayed exclusively in the trick playback mode relays information to a viewer about a plurality of the video frames. Accordingly, the multiplier factors the display time data to display the subtitle for a specified duration determined by controller 35 depending upon the situation.

A scheduler 21 is provided to ensure that the data received by the code buffer 22 from the demultiplexer 1 (FIG. 1) does not overflow the code buffer. The scheduler controls read/write access to the code buffer by determining the bandwidth for an I/O port (not shown) which receives the bit streams selected by the word detector. The bandwidth refers to the read/write rate and is calculated by dividing the rate at which the demultiplexer demultiplexes data by the number of parallel bits written or read from the code buffer. For example, a data rate from the demultiplexer of 20 Mbps divided by 8 parallel bits results in a 2.5 Mbps rate of data read from the code buffer. Therefore, the scheduler will set the read/write rate of the I/O port in order to maintain a consistent flow rate of data into and out of the code buffer. The code buffer, thus, receives the subtitle data (Bitmap) and awaits a decode start signal from the system controller to read out the data.

Advantageously, the system controller executes reading in real time when it is determined from the horizontal and vertical sync signals that the television display is at a position corresponding to the position indicated by the position data. For real time display, the reading rate should correspond to a picture element sampling rate, preferably 13.5 MHz. As discussed, the subtitle data preferably is written into the code buffer at a rate of 2.5 MHz or more. Thus, the 13.5 MHz sampling clock is divided into four clock cycles of 3.375 MHz each. One of these 3.375 MHz clock cycles is allocated to writing (because writing requires at least 2.5 MHz) and the remaining three clock cycles are allocated to reading data from the code buffer, thus satisfying the requirement for real time display.

The read/write operation described is not only advantageously performed in real time, but also provides high resolution. Eight bits of the subtitle data are read from the code buffer 22 for each of three read clock cycles, or twenty-four bits per sampling clock. When display of the picture is conducted by the television monitor every fourth clock cycle, one-fourth of the twenty-four bits, (24/4=6 bits are displayed at every clock cycle. That is, each subtitle picture element may comprise six bits, which is more than sufficient to achieve a high quality of resolution for the subtitles.

Figure 13:
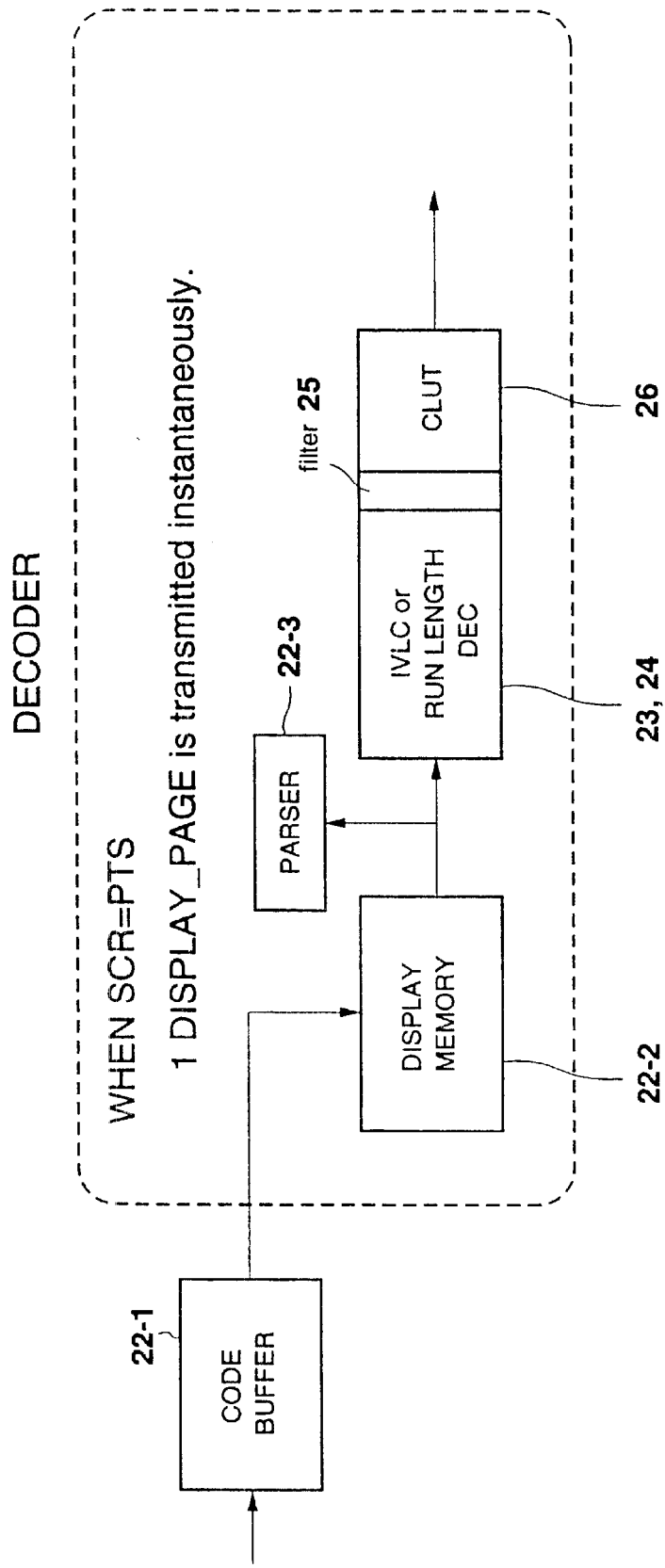
FIG. 13 is a block diagram describing the internal operation of the code buffer in FIG. 2.

The operation of the code buffer 22 and corresponding components of FIG. 2 is depicted in the block diagram in FIG. 13. The code buffer 22-1 accumulates bit streams of subtitle data until at least one page of subtitle data is accumulated in the code buffer. The subtitle data for one page is transferred from the code buffer 22-1 to the display memory 22-2 (which acts as a buffer for the subtitle decoder) when the subtitle portion of the display time stamp (PTS) is aligned with the synchronizing clock (SCR). The synchronizing clock advances a pointer in the display memory 22-2 during reading indicating which address of the stored subtitle data is being currently read. It will be noted that placing the code buffer and display memory in a single unit is preferred since the code buffer need only increment one pointer for pointing to the current address in the display memory 22-2 which stores the next set of subtitle data. With an internal memory, therefore, virtually no delay is attributed to a transfer operation, resulting in a high speed transfer of the subtitle data.

When the code buffer is read during a normal playback mode, the synchronizing clock advances the pointer of the display memory 22-2 at each clock pulse. However, during special (or trick) reproduction (such as fast-forward, fast-reverse playback modes), the pointer is advanced at a different rate. To this end, a special command is first sent to the controller 35 and the controller sends back an acknowledge signal (special_ack), acknowledging that special reproduction is to be initiated. To uniformly speed up (or slow down) the operations of the subtitle decoder according to the special reproduction rate, the system clock reference (SCR) can be altered by adding or subtracting clock pulses. Subtraction pulses are created at an n times rate corresponding to the rate of fast-feeding or fast-reverse feeding. For example, at the time when special reproduction is commenced, real time subtraction is performed on the bit stream of subtitle data read out from the code buffer at the n times rate and the pointer advances at the desired rate to effect the special playback mode.

When the special reproduction operation corresponds to a pause operation, on the other hand, no subtraction pulses are created. Instead, an identical frame is continuously read from the code buffer repeatedly, thus providing the illusion sensation that the subtitles are paused.

The reading operation is ended when subtitle decoder 7 determines that an end of page (EOP) of the subtitle frame is reached. The system controller sends a repeat time signal to the controller 35 which indicates the length of a page. An inverse run-length circuit 24 includes a counter and sends a display end signal to the controller 35 when the count value of the counter reaches the value indicated by the repeat time signal. When controller 35 determines that the repeat time is reached, the reading operation of the code buffer is stopped. For purposes of this invention, the code buffer preferably stores at least two pages of subtitle data because one page will be read while another page is written into the code buffer.

Controller 35 issues a buffer overflow signal to system controller 14 when an overflow of code buffer 22 occurs. An overflow can be determined when the controller receives the display end signal from inverse run-length circuit 24 before word detector 20 receives an end of page (EOP) signal on the following page. At that time, the system controller withholds transfer of subtitle data from data decoder and demultiplexer 1 (FIG. 1) to the word detector to prevent an overflow of the code buffer. When an overflow condition has passed, the next stream will be written into the code buffer and displayed at the correct display start position.

An underflow condition exists when code buffer 22 has completed reading the subtitle data for an entire page and no further data exists in the code buffer. The code buffer is depicted with a capacity of two pages by the "code buffer size" line in FIG. 12. Graphically, an underflow would appear in FIG. 12 as one of the vertical portions of line (C) which extends below the lower limit of the code buffer. By contrast, an overflow condition is graphically depicted in FIG. 12 when the subtitle data read into the code buffer is too large, i.e., the horizontal portion of line (C) extends beyond line (B).

Figure 12:
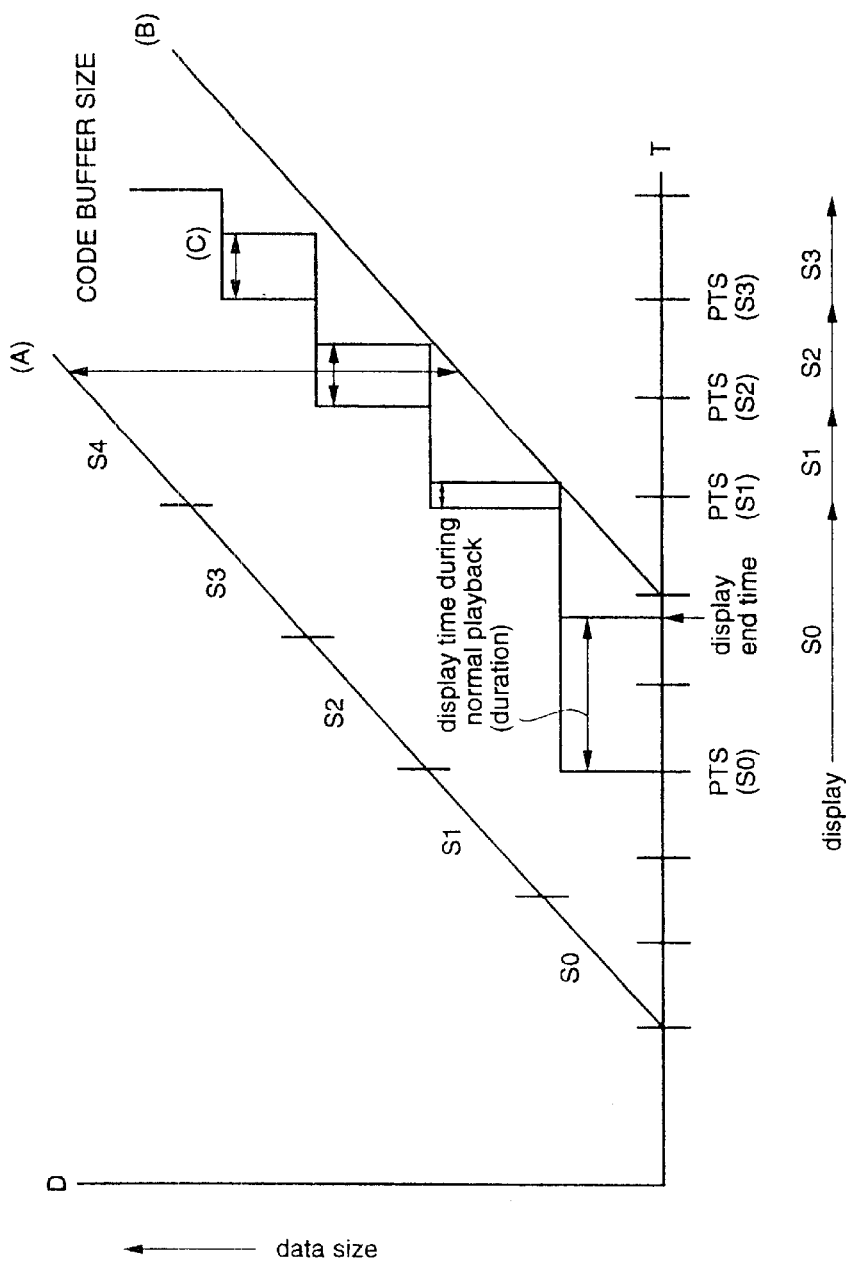
FIG. 12 is a graph for the explanation of a code buffer operation.

FIG. 12 graphically demonstrates the data flow into and out of code buffer 22. The T-axis (abscissa) represents time, while the D-axis (ordinate) represents data size for each page of data. Thus, the gradient (rise/run) represents the data flow rate of the subtitles into the code buffer. Graph (C) represents the data flow of the subtitle data. The vertical portions of graph (C) indicate a transfer of subtitle data from the code buffer when the display time stamp (PTS) is aligned with the synchronizing clock (SCR) generated internally by subtitle decoder 7. The horizontal portions of the graph (C) indicate the transfer of subtitle data into the code buffer, the display time for normal playback mode indicated by the horizontal lines with arrows. For example, at a time that the display time stamp (PTS) for page (S0) is received by the code buffer, the previous page of subtitle data is transferred from the code buffer and page (S0) is written into the code buffer. When another display time stamp (PTS) is received by the code buffer, the subtitle data of page (S0) is transferred out of the code buffer and page (S1) is written in. Similarly, the remaining pages (S2), (S3) are written into and read out of the code buffer as indicated.

To precisely time the reading of the subtitle data from the code buffer with the display of the video image, delay compensation must be performed to allow for delays within the subtitle decoder. This is especially important where an external memory is employed as the display memory because an external memory increases the delay factor. Delay compensation is achieved by controlling the timing of the decode start command from system controller 14. The system controller delays the decode start command by a time equal to the processing of a letter box picture (approximately one field) and a delay caused by video decoding at the instant the synchronizing clock of the controller (SCR) is aligned with the display time stamp (PTS). Delay compensation is particularly useful, since the video, audio and subtitle data are multiplexed on the premise that the decode delay in each of the video, audio and subtitle data signals is zero in the data encoding apparatus.

When the subtitle data for one page is read out of the display memory 22-2 (FIG. 13), the headers of the bit streams are separated therefrom by a parser 22-3 and the remaining data is forwarded to the inverse variable-length coder or run-length decoder 23, 24 during a vertical blanking period (V). Inverse VLC (Variable Length Coding) circuit 23 (FIG. 2) subjects the subtitle data to variable length decoding. The variable length decoded subtitle data is composed of level data ("1" or "0") and run data as paired data. In the case where variable length decoding is not employed, the inverse VLC circuit may be bypassed and the subtitle data read from the code buffer will be directly output to inverse run-length circuit 24. Inverse run-length circuit 24 conducts run-length decoding by generating the level of data from the number of run data elements. Thus, VLC circuit 23 and run-length circuit 24 decompress the subtitle data which had been stored as compressed data in code buffer 22.

The decompressed subtitle data is then sent to a 3:4 filter 25. The 3:4 filter receives an xsqueeze signal from the system controller 14 indicating the aspect ratio of the corresponding television monitor. Where the signal indicates that the monitor has a 4:3 aspect ratio, the 3:4 filter applies 3:4 filtration processes to the subtitle data to match the size of the subtitles to the size of the video picture. In the preferred embodiment, the controller 35 reads 90 pixels worth of subtitle data from the code buffer 22 before the H sync pulse is generated. In the case where the television monitor already has a 16:9 aspect ratio, or the decompressed subtitle data represents fonts, the 3:4 filter is bypassed.

A color look-up table 26 (CLUT) receives the subtitle data from the 3:4 filter 25 and the CLUT_data from the code buffer 22. The color look up table generates a suitable color from the CLUT_data for the subtitle data. The color look up table selects an address corresponding to the subtitle data for each pixel and forwards a mixing ratio K and color components Y (luminance), $C_R$ (color difference signal R-Y) and $C_B$ (color difference signal B-Y) to the mixer 34. The color components Y, $C_R$ and $C_B$, when mixed by mixer 34, at the mixing ratio K create a pixel with the color indicated by the color look up table.

Background video data is incorporated in the arrangement of the color look-up table. For example, address 0 of the look-up table includes key data K having the value of 00 h; which means that the subtitle data will not be seen and the background video data will manifest, as shown by regions T1 and T5 in FIG. 7c. Addresses 1 h to 6 h of the look-up table include values of the key data K which increase linearly (20, 40 . . . C0 hexadecimal); which means that the subtitle pixels according to these addresses are mixed with the background data as shown by the regions T2 and T4 in FIG. 7c. Finally, addresses 8 h to Fh of the look-up table include values of key data K of E0h; which means that the components Y, Cr and Cb are mixed without any background video data as shown by region T3 in FIG. 7c. The color look-up table data is generated from the system controller and is previously downloaded to the CLUT circuit before decoding. With the color look-up table, the filtered subtitle data is transformed into the appropriate color pixel for display on the television monitor.

FIG. 8 shows one example of a color look-up table where the components Y, Cr, Cb and K are arranged according to the addresses 0 . . . F (hexadecimal). As will be explained, color wiping is performed by changing the CLUT_data, thereby replacing part of the color look up table by the color wiping color look up table shown in FIG. 11. Normally, a particular subtitle frame is refreshed several times because frames are refreshed in a television signal several times a second. When the subtitles are refreshed, the same subtitle data will be employed. However, the color will be different due to the changed color look up table. Thus, the subtitles will appear to be color wiped as they are refreshed with each consecutive frame.

A mixer 34 (FIG. 2) mixes the pixels from the color look-up table 26 with video data from video decoder 3 (FIG. 1). The resulting mixed data represents a video picture with superimposed subtitles and is ready to be output to a television monitor. Mixer 34 is controlled to position the subtitles within the video picture by referencing a u_position signal generated by system controller 14 from commands of an operator via controller 35. The u_position value designates the vertical position for display on the screen and may be varied (either by a user, the transmitter, or otherwise) allowing a user to place the subtitles anywhere along a vertical axis.

The decoding apparatus of the present invention may be practiced with the parameters for the different signals shown in FIG. 6. However, the present invention is not limited to the parameters set forth in that figure and may be employed in different video systems.

With the present invention, a user has control over the display of the subtitle through a mode display device 9 (FIG. 1). System controller 14, upon command from the user, sends a control signal to mixer 34 (FIG. 2), turning the subtitles on or off. Since the present invention decodes subtitles in real time, the user does not experience any unpleasant delay when turning the subtitles on or off. In addition, the subtitles can be controlled, by the user or otherwise, to fade-in/fade-out at a variable rate. This is achieved by multiplying a fade coefficient to the pattern data representing the subtitles at a designated speed. This function also allows an editor of the subtitles to present viewers with different sensations according to the broadcast of the audio/video picture. For example, news information may be "flashed" rapidly to draw the attention of the viewer, whereas subtitles in a slow music video "softly" appear in order not to detract from the enjoyment of the music video.

Subtitle Searching

The present invention provides a viewer with the capability to search for a specific scene or sound quickly and efficiently. For example, the viewer may wish to quickly locate a specific dialogue in a video recording of an office meeting without watching lengthy periods of relative inactivity in the meeting. The present invention provides subtitles exclusively displayed during the trick playback mode and the viewer can quickly locate the desired dialogue by scanning such subtitles during the trick playback mode. Preferably, only those video frames which have subtitles displayed in the trick playback mode are played back, skipping over the scenes of relative inactivity to the important scenes. The subtitles for display in the trick playback mode may be narrative in that a single page of subtitles corresponding to one video frame may be displayed over the course of a plurality of video frames to describe an entire scene or dialogue. In this manner, the viewer can easily locate any information in the video picture desired quickly and efficiently and need not wait through periods of relative inactivity.

An example of displaying subtitles from bit streams of data decoded from the record medium is shown in FIGS. 4A and 4B, wherein the bit streams include video bit streams (V_I, V_P, V_B), audio bit streams (A) and subtitle bit streams (Sp, Sw). Reproduction of the subtitle (Sp) for normal playback mode is shown in FIG. 4A, where it will be noticed that the subtitle (Sp) for the normal playback mode is divided into three bit streams which must be recombined to comprise one page of subtitles for a respective video frame. When the tape is moving in a forward direction in the normal playback mode, the bit streams of the subtitle (Sp) are reproduced by causing the pickup to jump to the individual bit streams of the subtitle as indicated by the arrows extending from left to right in FIG. 4A. Similarly, when the tape is moving in a reverse direction in the normal playback mode, the bit streams of the subtitle (Sp) are reproduced by causing the pickup to jump to the bit streams according to the arrows extending from right to left. After the bit streams for the subtitle (Sp) are reproduced, the decoder of FIG. 2 decodes the subtitle (Sp) for display with the corresponding video frame.

According to the present invention, subtitles (Sw) to be displayed in the trick playback mode, which may be different in textual content from the subtitle (Sp), are recorded-adjacent to video frames (V_I). It will be appreciated that not all video frames (V_I) will be displayed in the trick playback mode and do not have an adjacent subtitle as shown in FIG. 4B. The subtitle decoder of the present invention, during a forward trick playback mode, will decode each subtitle (Sw) in the direction of the arrows from left to right in FIG. 4B and, similarly, decode in the direction of the arrows from right to left in reverse trick playback mode. Notably, the third video frame (V_I) is skipped because that video frame does not have a subtitle (Sw) since, for example, that video frame has little activity.

With the present invention, the subtitles displayed in trick playback mode may be of different textual content from the normal playback subtitles. This means that the trick mode subtitles may include "special" information describing the scene or corresponding sounds. Indeed, the trick mode subtitles may be played back without the normal playback subtitles or the video picture, which provides the viewer with the ability to quickly find the desired information by scanning only the trick mode subtitles. Thus, the present invention provides quick and efficient location of information in a video picture by skipping to those video frames which have significant information.

The present invention, during encoding, stores a starting sector address where the page header portion of the subtitle bit streams are located in areas reserved for addresses on the record medium for later retrieval during decoding. In a first embodiment, the invention stores the addresses of the subtitles to be displayed in trick playback mode in a table of contents (TOC) (FIGS. 3A, B) located at the beginning of the disc. The table of contents is not encoded and, therefore, is read directly by the system controller to drive the pickup to the addresses corresponding to the subtitles to be displayed in trick playback mode.

The table of contents shown in FIG. 3A identifies frames by frame number (subcode frame #) and pointers (POINT) pointing to a track on the disk at which the corresponding frame is located, and time codes (PMIN, PSEC, PFRAME) corresponding to that frame. The table of contents identifies pages of stream data by indicating the frame, starting sector address, and ending sector address of recorded pages. From this table of contents, the system controller can locate the beginning of the subtitle pages and cause drive control 15 (FIG. 1) to jump the pickup to the sector indicated by the start_sector address in the table of contents.

As shown in FIG. 3B the present invention may also store in the "trick playback duration" column, the display time data for the subtitles to be displayed. The controller (FIG. 2) determines the duration of display of the subtitle for various playback speeds using display time data by changing the multiplicative factor of multiplier 350 which factors the display time data in proportion to the playback speed.

In a second embodiment of the invention, the sector addresses for the page header portions are collected in an area of the disk called a stream map. Similar to the previous embodiment, the addresses here are directly employed by the system controller (FIG. 1) without the need for decoding. Unlike the table of contents, however, the stream map is not necessarily confined to the beginning of the disk, but may be located at any sector. The stream map is, thus, arranged as a packet with video, audio, subtitle, blanking, packet length of stream, identifier, and length of stream map information. The system controller references the stream map in a similar manner to the table of contents, thus causing the pickup to reproduce pages of subtitles by sending the reproduced pages of subtitle streams to the subtitle decoder.

In a third embodiment, the sector addresses of the previous and following pages of subtitle streams are stored in each page header portion of a currently reproduced page. Since the sector addresses are in the page header portions, the sector addresses are sent to the subtitle decoder to be decoded, not the system controller. The word detector 20 of the subtitle decoder (FIG. 2) detects the subtitle stream sector addresses (subtitle stream sector address) and forwards them to the system controller, via controller 35. As each subtitle is decoded in, for example, the forward playback mode, the system controller recalls the following sector address for the next page and causes the pickup to jump to the sector indicated by that following address to reproduce the next page of subtitles. Similarly, in the reverse playback mode, the system controller recalls the previous sector address for the previous page and causes the previous page of subtitles to be reproduced. Specifically, the word detector detects whether a stream includes sector addresses according to the following operation:

|  | No. of bits | Mnemonic |
|---|---|---|
| user_data_flag | 1 | uimsbf |
| if(user_data_flag = "1")[ | | |
| length_of_user_data | 16 | bslbf |
| next_subtitle_address_offset | 32 | bslbf |
| reserved | 8 | bslbf |
| previous_subtitle_address_offset | 24 | bslbf |
| reserved | 8 | bslbf |
| ] | | |

System controller 14 (FIG. 1) acts as a computer and executes the above operation, causing the word detector to determine if the user_data_flag is set to "1" and, if so, treats the next 16 bits as length_of_user data; the next 32 bits as next_subtitle_address_offset; the next 8 bits as reserved; the next 24 bits as previous_subtitle_address_offset; and the last 8 bits as reserved. The word detector forwards this information to the system controller, via the controller 35, and continues detecting subtitle streams. The system controller receives the subtitle page sector addresses from this operation and controls the decoding apparatus as described.

The record medium, thus, functions as a computer-readable memory which directs the system controller as a computer to playback the subtitles during a trick playback mode. The addresses as shown in, for example, FIGS. 3A and 3B, act as pointers which direct the computer (i.e., system controller 14) to skip to a location on the record medium where a subtitle to be displayed in the normal playback mode is recorded. During the trick mode playback, the pointer directs the computer to skip to a location on the record medium where a subtitle to be displayed during the trick playback mode is recorded. More specifically, the pointers cause the system controller to drive the drive controller 15 to move a pickup (FIG. 1) to jump to the indicated addresses of the record medium and read the subtitles. It will be appreciated that the computer-readable memory may be, for example, a video disc, a tape medium, or the like.

Encoding Technique

The encoding technique employed in the present invention will be described in more particular detail with reference to FIGS. 7A, 7B, 7C and FIG. 8. As an example, the technique for encoding the letter "A" of FIG. 7A will be explained. The letter "A" is scanned along successive horizontal lines and the fill data of FIG. 7B is generated for the letter "A" along each horizontal line. It will be noted that the level "E0" demarks the highest level for recreating a color pixel from the color look-up table shown in FIG. 6, whereas level "0" represents a lack of subtitle data.

The key data (K) (or mixing ratio) determines the degree to which the fill data is mixed with background video. Regions T1 and T5 of the key data correspond to areas in the video picture that are not superimposed with the fill data; therefore, these areas are designated as level 0 as indicated by address 0 in FIG. 8. Regions T2 and T4 are mixed areas where the subtitles are gradually mixed with the background video picture so that the subtitles blend into the background video picture and do not abruptly contrast therewith. Any of the fill data in this area is stored in addresses 1 through 6 of the color look-up table. The main portion of the letter "A" is displayed within the T3 region where the background information is muted. The subtitle information in region T3 is stored as addresses 7 to F (hexadecimal). The color look-up table of FIG. 8 is arranged in varying degrees of the luminance component Y. When a pixel in the region T3 is to be stored, for example, and the level of the luminance component Y for that particular pixel is 20 (hexadecimal), the color information for that pixel is obtained from address 9 (FIG. 8). In this manner, the remaining pixels for the subtitle characters are encoded.

Encoding Apparatus

Figure 9:
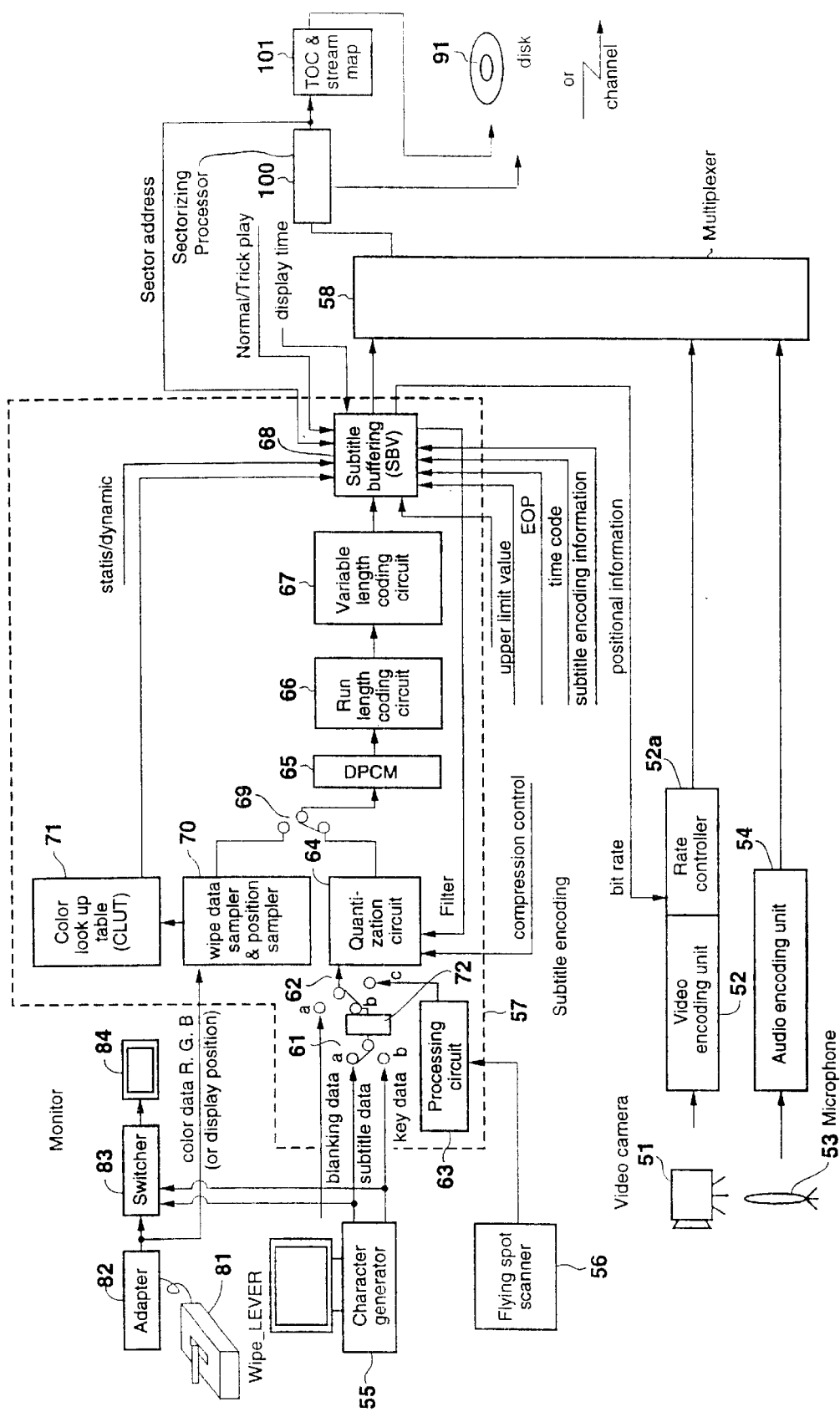
FIG. 9 is a block diagram of the encoding apparatus of the present invention.

The encoding apparatus of the present invention is depicted in FIG. 9. Audio and video information is received by a microphone 53 and video camera 51, respectively, and forwarded to a multiplexer 58. The subtitle data are entered through either a character generator 55 or a flying spot scanner 56 and encoded by a subtitle encoding circuit 57. The encoded subtitle information is sent to multiplexer 58 and combined with the audio/video information for recording onto a record disc 91 or supplied to a channel for transmission, display, recording or the like.

Video camera 51 generates the video signal and supplies the same to a video encoding unit 52 which converts the video signal from analog to digital form. The digitized video signal is then compressed for video transmission and forwarded to a rate controller 52a, which controls the rate that the compressed video data is transferred to the multiplexer in synchronism with the rate that the subtitles are sent to the multiplexer. In this manner, the compressed video data is combined with the subtitle data at the correct time. Similarly, audio information is obtained by microphone 53 and encoded by an audio encoding unit 54 before being sent to the multiplexer. The audio encoding unit does not necessarily include a rate controller because the audio data may ultimately be recorded on a different track or transmitted over a different channel from the video data.

The subtitles are generated by either character generator 55 or flying spot scanner 56. The character generator includes a monitor and a keyboard which allows an operator to manually insert subtitles into a video picture. The operator edits the subtitles by typing the subtitles through the keyboard. Flying spot scanner 56, on the other hand, is used for the situation where subtitles are already provided in an external video picture or scanned in as text. The flying spot scanner scans the video picture and determines where the subtitles are positioned and generates corresponding subtitle data therefrom. The subtitles from the flying spot scanner are pre-processed by a processing circuit 63 to conform with subtitles generated by the character generator before further processing by the subtitle encoding circuit.

The subtitle data from either character generator 55 or flying spot scanner 56 are, then, selected for compression. The character generator outputs blanking data, subtitle data and key data. The subtitle data and key data are forwarded to a switch 61 which is switched according to a predetermined timing to select either the subtitle or key data. The selected data from switch 61 is filtered by a filter 72 and supplied to another switch 62. Switch 62 switches between blanking data, the filtered data from the character generator, and the processed data from the flying spot scanner. When it is determined that no subtitles are present, the blanking data is chosen by switch 62. Where subtitles are present, switch 62 chooses between the character generator data or the flying spot scanner data, depending upon which device is being used to generate the subtitle data.

The data selected by switch 62 is quantized by a quantization circuit 64, using a quantization level based on data fed back from a subtitle buffering verifier 68. The quantized data, which may be compressed, is supplied to a switch 69 and (during normal operation) forwarded to a differential pulse code modulation (DPCM) circuit 65 for pulse code modulation. The modulated data is run-length encoded by a run-length coding circuit 66, variable-length encoded by a variable-length encoding circuit 67 and forwarded to the subtitle buffering verifier 68 for final processing before being sent to multiplexer 58.

Subtitle buffering verifier 68 verifies that the buffer is sufficiently filled with data without overflowing. This is done by feeding a control signal (referred to in FIG. 9 as a filter signal) back to the quantization circuit. The control signal changes the quantization level of the quantization circuit, thereby changing the amount of data encoded for a particular subtitle. By increasing the quantization level, the amount of data required for the subtitle data is reduced and the bit rate of data flowing to the subtitle buffering verifier is consequently reduced. When the subtitle buffering verifier determines that there is an underflow of data, the control signal decreases the quantization level and the amount of data output from the quantization circuit increases, thereby filling the subtitle buffering verifier.

The subtitle buffering verifier is also responsible for preparing the subtitle data for transmission (over television airwaves, for example). The subtitle buffering verifier, to this end, inserts information necessary to decode the encoded subtitle data. This information includes a normal/special play signal which indicates whether the subtitles are recorded in a normal or special (fast-forward/reverse) mode (referred to above as the trick mode). An upper limit value signal is inserted which indicates the upper limit for the memory size of the subtitle data for a frame. An EOP signal marks the end of page for the subtitle data frame and also is inserted. A time code signal is inserted which is used as the time stamp PTS in decoding. Subtitle encoding information is inserted and includes information used in encoding the subtitle data, such as the quantization factor. Positional information is inserted and is used as the position_data upon decoding. A static/dynamic signal is inserted which indicates whether the subtitle data is in static or dynamic mode. The subtitle buffering verifier also inserts the color look up table address for transmission to the decoder so that the colors of the display will match the colors employed in creating the subtitles.

The subtitle buffering verifier is preferably a code buffer similar to the code buffer of the decoder (FIG. 2). To that end, it is useful to think of the operation of the subtitle buffering verifier to be in symmetry (i.e., performing the inverse functions of the code buffer) with the code buffer. For example, the color pixels of the subtitles are converted into digital representations; the resultant digital subtitles are encoded by the run length encoder and the variable length encoder; header information is added; and the resultant subtitle information is stored in a buffer and forwarded to multiplexer 58 for multiplexing with the audio and video data.

Multiplexer 58 preferably employs time-sliced multiplexing; and also provides error correction processing (e.g., error correction coding) and modulation processing (e.g., EFM, eight-to-fourteen modulation). The multiplexed data is then transmitted (via television broadcasting, recording, or other means of transference) to the decoding apparatus for decoding and display.

Encoding Subtitles

The present invention permits a viewer to search for a specific scene or audible speech by providing subtitles to be exclusively displayed in the trick playback mode. The manner in which the encoder, already described with reference to FIG. 9, encodes the addresses will now be discussed. After multiplexer 58 multiplexes the audio, video and subtitle data streams, the multiplexed data is sent to a sectorizing processor 100 which arranges the data streams into fixed length sectors of packets. At this point, the data streams are ready for airwave transmission. When the data streams are to be recorded on a disc, however, a table of contents (TOC) & stream map generator 101 determines the addresses of the pages of data streams to be recorded on the disk.

According to the first embodiment, the TOC & stream map generator generates the table of contents shown in FIGS. 3A, B from the sectors generated by the sectorizing processor and the video/audio search information generated, for example, by a viewer. In the second embodiment, the TOC & stream map generator generates the stream map from the sectors generated by the sectorizing processor. Unlike the previous embodiment, the TOC & stream map generator inserts the stream map as a packet onto the disk. In the first two embodiments, system controller 14 of the data reproducer (or receiver) reads the table of contents or the stream map directly and causes the decoding apparatus (FIG. 1) to decode the streams which relate to the data type being searched. In the third embodiment, the TOC & stream map generator inserts the previous and following page addresses into each of the page header portions of the pages. Unlike the first two embodiments, the system controller must cause the subtitle decoder to decode the page of subtitle streams and extract therefrom the sector addresses. As described, the TOC & stream map generator encodes each stream with 1 bit of a user_data_flag that indicates whether stream addresses are forthcoming in the stream; the next 16 bits as length_of_user_data; the next 32 bits as next_ subtitle_address_offset; the next 8 bits as reserved; the next 24 bits as previous_subtitle_address_offset; and the last 8 bits as reserved.

According to the present invention, the video image, the audio track, and the subtitles are arranged in units of pages (i.e., frames) on the disc and the system controller accesses information by recalling from the disc the pages of streams. With this scheme, the system controller can cause the decoder to decode only those subtitles which correspond to video frames of relatively significant information. Thus, a viewer can browse through the video picture by reading the subtitles and view only those portions which are of interest.

Colorwiping Encoding

Colorwiping refers to a process by which an image, such as the subtitles, is gradually overlaid with another image. An exemplary application of colorwiping is highlighting, wherein a frame of subtitles is dynamically highlighted from left to right with the passage of time. The present invention performs colorwiping by changing the color look up table at different points of time during the subtitle display. For example, an initial subtitle frame is generated with the standard color look up table in FIG. 8. When colorwiping is performed, the color look up table is changed to the color wiping look up table of FIG. 11. With the passage of each frame, the gradual change of the position at which the color look up table is changed from the colorwiping to the standard color look provides the sensation that the subtitles are changing color dynamically over time from left to right.

Figure 10:
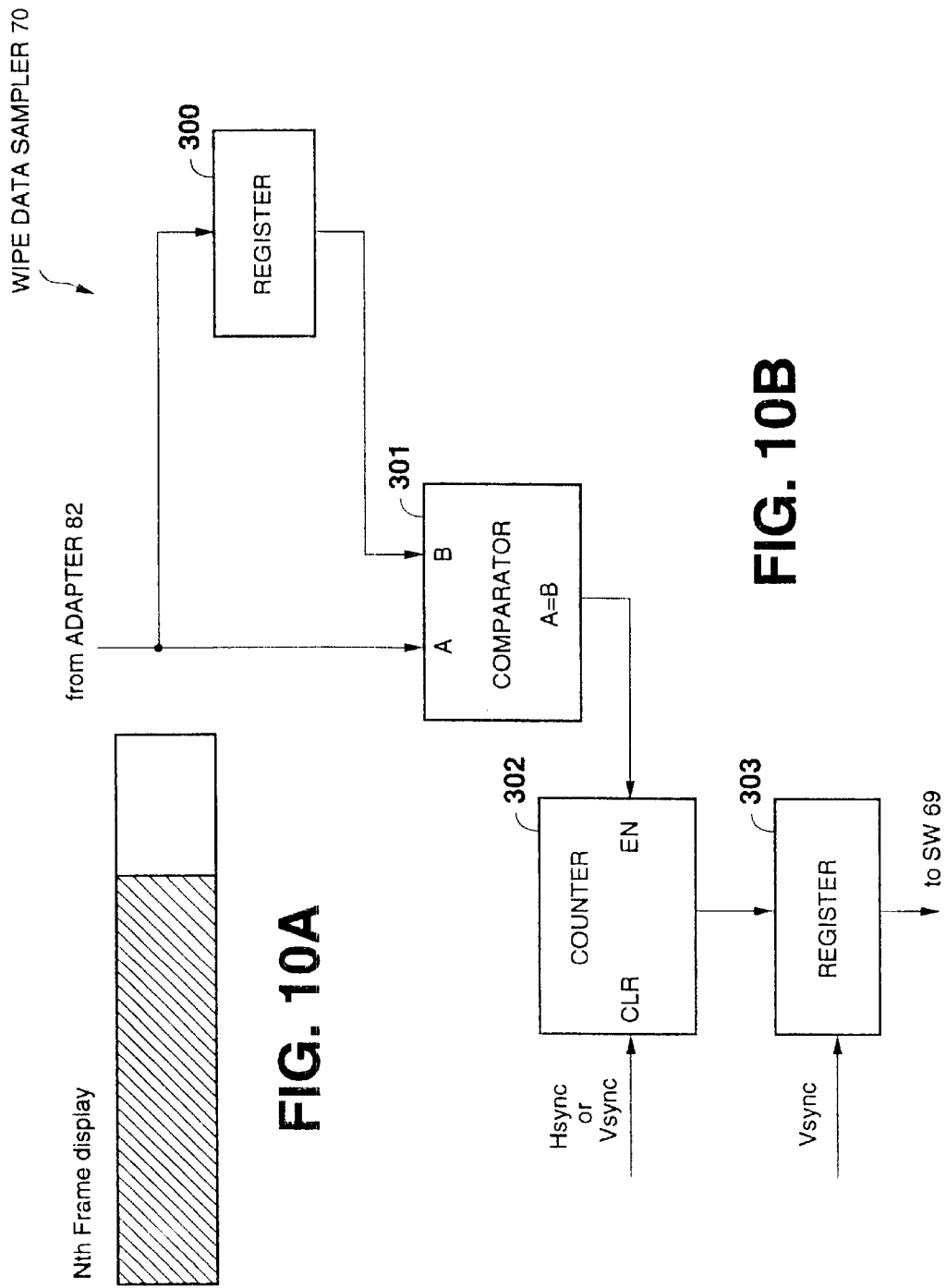
FIGS. 10A and 10B depict a block diagram for the wipe data sampler of FIG. 9.

An encoding operation for color wiping will now be discussed with reference to FIGS. 9 and 10. During the course of encoding subtitles, an operator may desire to color wipe the previously encoded subtitles. To that end, the operator is provided with a wipe lever 81 to control the colorwiping and a monitor 84 to view the color wiping in real time. The wipe lever is connected to an adapter 82 to adapt the analog voltages of the wipe lever to digital signals suitable for digital manipulation. The digital output of the adapter is fed to both a switcher 83 and a wipe data sampler 70. The switcher switches the color look up table to values represented by the position of the wipe lever and generates color pixels of the subtitles for display on the monitor. Thus, the operator can visually inspect the colorwiping procedure while it occurs and adjust the speed or color of the wiping to satisfaction.

The wipe data sampler and position sampler 70 determines from the adapter signals where in the video picture the color look up table is to be changed and outputs this information to encoding circuits 65, 66 and 67 (via switch 69) for encoding and transmission to multiplexer 58. FIGS. 10A and 10B depict a block diagram of the operation of the wipe data and position sampler. A comparator 301 compares a present pixel signal generated by the adapter with a previous pixel signal from the adapter. This is achieved by transmitting the present pixel value to input A of comparator 301 while supplying the previous pixel value latched in a register 300 to input B of comparator 301. The comparator outputs a boolean "true" value to a counter 302 (which is reset at every horizontal or vertical sync pulse) when the present and previous pixels have the same value and, in response thereto, the counter increments a count value. That is, the comparator registers a true condition when the pixels up until that point are generated from the same color look up table. At the point where the color look up table changes, therefore, the present and previous pixels become unequal (i.e., their color changes) and the comparator generates a "false" boolean condition. The count value, thus, is equal to the number of matches between the present and previous values, which is the same as the position at which the color look up table changes. The count value is latched by a register 303 upon the following vertical sync pulse and transferred to the encoding circuits (via switch 69) for transmission.

Colorwiping Decoding

Figure 14A:
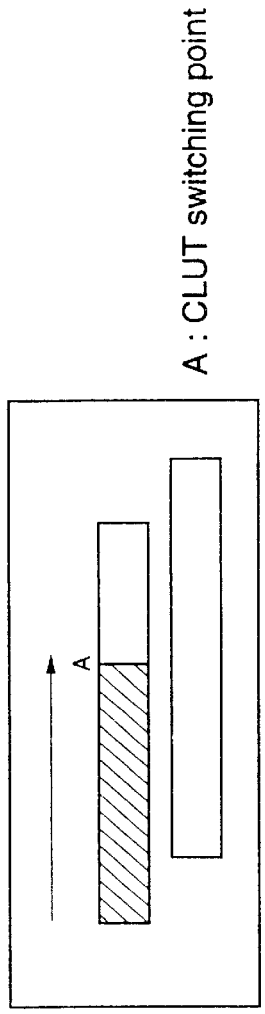
FIGS. 14A to 14C depict a scheme for the colorwiping operation.
Figure 14B:
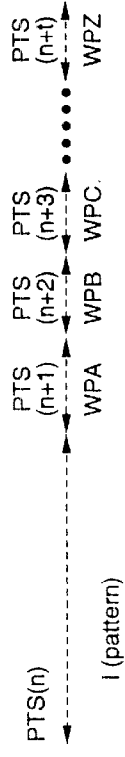
Figure 14C:
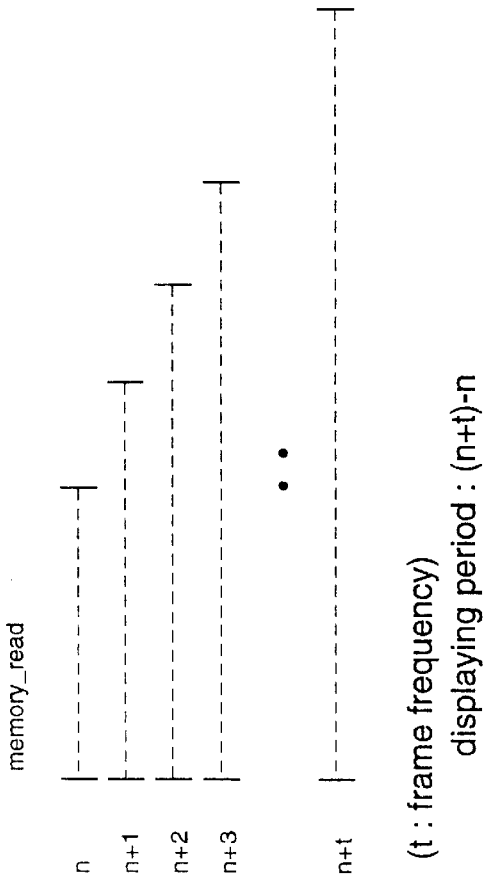

Color wiping decoding will now be discussed with reference to FIGS. 14A–C and 15. FIG. 14A shows the position here the color look up table is switched at point A from a color wiping look up table (FIG. 11) to the standard color look up table (FIG. 8). FIG. 14B depicts a pattern of subtitle and colorwipe data arranged in discrete blocks of presentation time stamps (PTS(n) . . . PTS(n+t)). The first presentation time stamp PTS(n) corresponds to normal subtitle data and the remaining presentation time stamps PTS(n+1 . . . n+t) correspond to colorwiping data (WPA . . . WPZ). FIG. 14C shows successive frames (n . . . n+t) which correspond to the presentation time stamps. To execute colorwiping, ea ch successive colorwiping frame (WPA . . . WPZ) sets the point where the color look up table is switched (point A) further along the displayed subtitle, thereby dynamically performing colorwiping as a function of time.

An operational block diagram of the colorwiping decoding is depicted in FIG. 15. The vertical sync pulse triggers a register 205 to latch the current subtitle frame from a display buffer (FIG. 15 shows a colorwiping frame WP being latched). The colorwiping data latched by the register indicates the position of the color look up table switching. A pixel counter 208 decrements the value indicated by the colorwiping data at each horizontal sync pulse and outputs a boolean "true" flag to color look up table 26. While the flag is "true" the color look up table employs the colorwiping table (FIG. 11) to decode the colors of the subtitle pixels. When the pixel counter reaches zero, the position of color look up table switching is reached and the pixel counter issues a boolean "false" flag to color look up table 26. At this time, the color look up table switches the colorwiping color look up table (FIG. 11) to the standard look up table (FIG. 8), and the remainder of the subtitle frame is displayed in standard color mode. Each successive colorwiping frame (WPA . . . WPZ) moves the position of switching; thus, each refreshed subtitle frame advances (or retreats) the colorwiping, thus performing dynamic colorwiping.

The colorwiping color look up table in FIG. 11 incorporates two sets of colors (one set for addresses 0 h to 7 h and a second set for addresses 8 h to Fh). Thus, the colorwiping color can be changed to a secondary color simply by changing the most significant bit (MSB) of the color look up table address. For example, the first set of colorwiping colors has a MSB of "0", while the second set has a MSB of "1". Changing the MSB of address 7 h to a "1" transforms the address to Fh and the colorwiping color changes. This may be done, for example, by setting the MSB equal to the flag of pixel counter 208.

Employing the MSB to change between color sets has the advantage of reducing the number of bits required to be encoded. Since the MSB is known, only the three lower order bits need to be encoded where 4 bits are employed for every pixel. Where two bits are employed for every pixel, the subtitle data is coded only for the least significant bit. In a 4 bits per 2 pixel format, only the MSB is employed for color control and the remaining three bits can be reserved for pixel information. Thus, by using the MSB the number of bits encoded can be decreased and the overall processing time for encoding and decoding is optimized.

Dynamic Subtitle Positioning

Figure 16A:
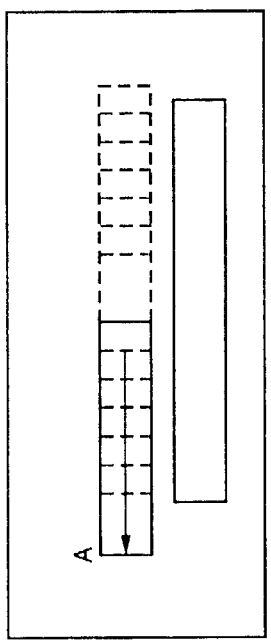
FIGS. 16A to 16C depict a scheme for the dynamic positioning operation.
Figure 16B:
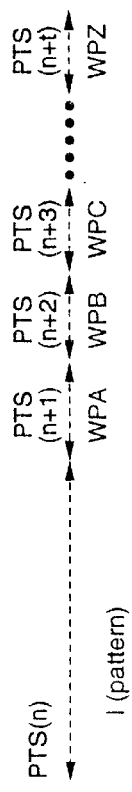
Figure 16C:
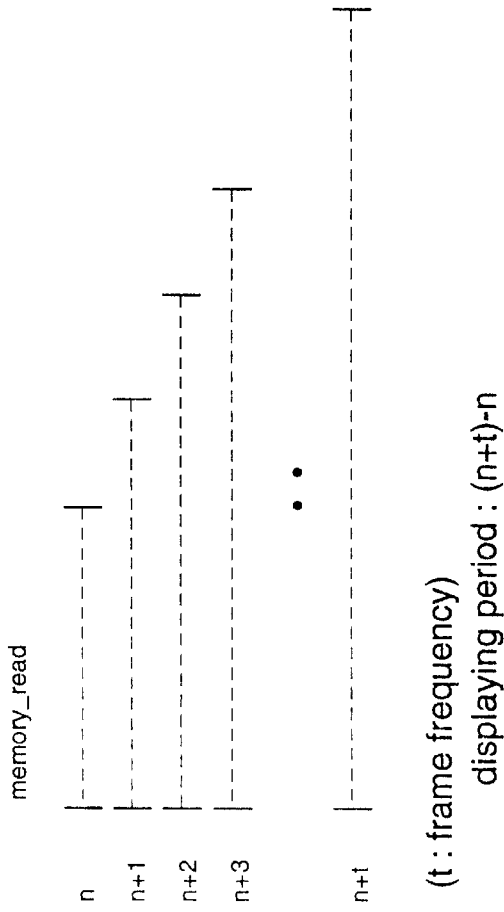
Figure 18A:
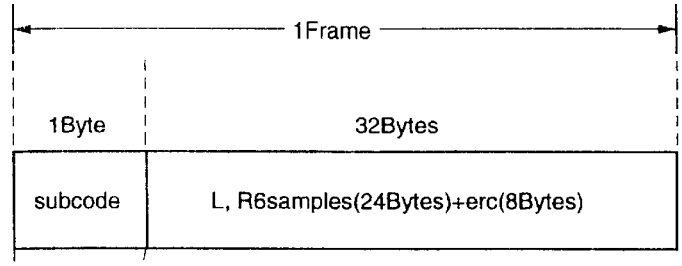
FIGS. 18A to 18C depict the arrangement of data according to a CD-G format.
Figure 18B:
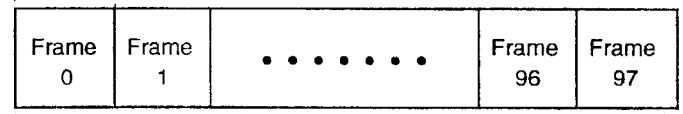
Figure 18C:
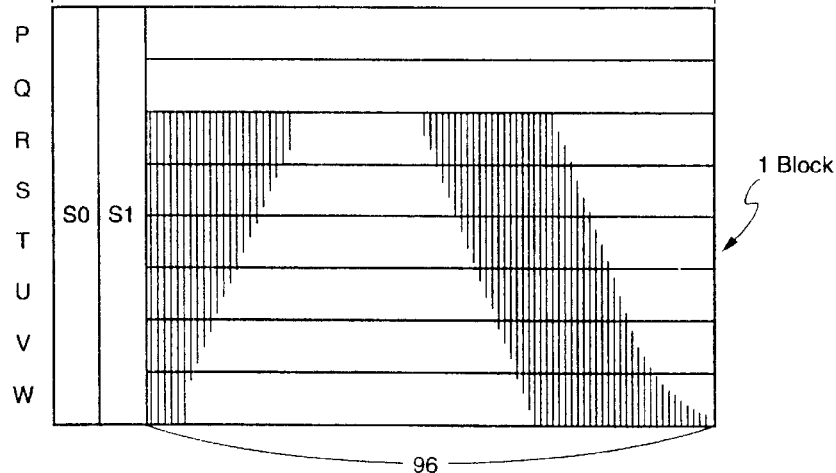
Figure 19:
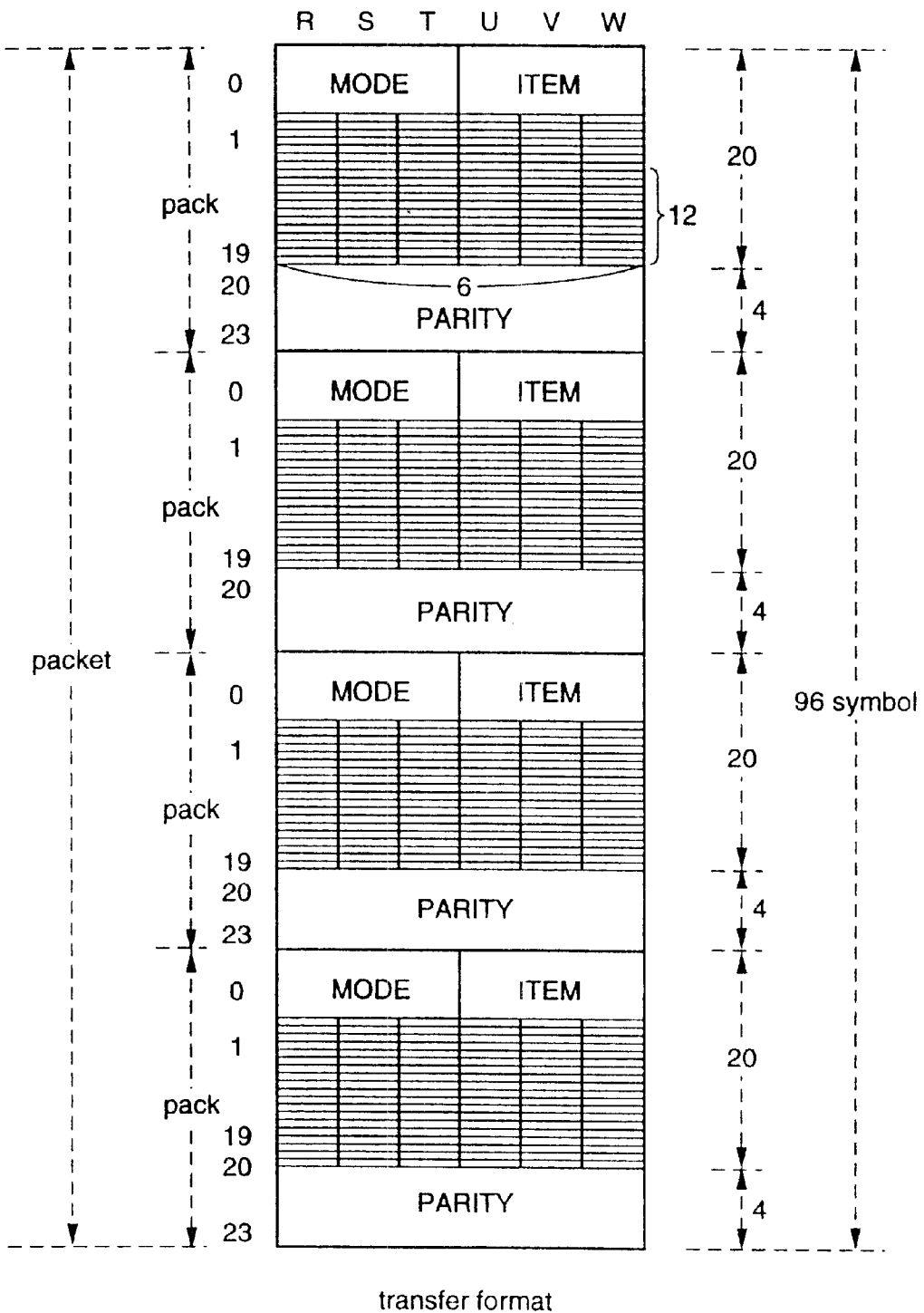
FIG. 19 depicts a transmission format of the data in the CD-G format.

The subtitles are repositioned dynamically, i.e., as a function of time, by employing a similar technique as described above with reference to colorwiping. As shown in FIGS. 16A–C and 17 the position data is measured along the horizontal axis (FIG. 16A) and is transferred to the subtitle decoder with the subtitle data during the appropriate frame (FIG. 16C) corresponding to a presentation time stamp (PTS(n), for example; FIG. 16B).

The positioning operation will now be explained with reference to FIG. 17. The position data is a value representing the position of the subtitle frame along the horizontal axis and is read out from the display buffer and latched by register 205 on each vertical sync pulse. Pixel counter 208 decrements the position data on each horizontal sync pulse and send a boolean flag to controller 35 (FIG. 2) to indicate that the position of the subtitle frame has not been reached. When the pixel counter reaches zero, the position of the subtitle frame has been reached and the boolean flag is toggled to indicate this to the controller. The controller, which has been delaying the reading operation of code buffer 22 (FIG. 2), then causes the code buffer to read out the subtitle data to run length decoder 24 (FIG. 2). The subtitle data is then decoded as described above and displayed with the corresponding video image. In this manner, the position of the subtitle frame is changed with each frame; thus providing dynamic movement of the subtitle frame.

It will be appreciated that the present invention is applicable to other applications, such as television or video graphics. It is, therefore, to be understood that, within the scope of the appended claims, the invention may be practiced otherwise than as specifically described herein.

What is claimed is:

1. A method of storing subtitles composed of bit streams of subtitle data on a record medium having sectors arranged by address, said subtitles being stored with encoded video data constituting a video picture composed of a series of video images, comprising the steps of:

writing a subtitle to be displayed with said video images on the record medium at an address;

writing said address on said record medium in an area reserved for addresses of the record medium;

encoding a display time information, wherein said display time information determines the length of time said subtitle is to be displayed regardless of the number of video frames played back;

writing said display time information on said recording medium in an area reserved for the display time information of the record medium;

encoding a color look-up table referred to during encoding a subtitle to be displayed with said video images on the record medium; and writing said color look-up table on said recording medium.

2. The method of storing subtitles of claim 1, wherein the step of writing a subtitle further comprises writing the subtitle as a page of bit streams of subtitle data beginning with a page header portion positioned at said address on the record medium.

3. The method of storing subtitles of claim 2, wherein the step of writing said subtitle further comprises encoding said display time information within said page header portion indicating a display time for displaying the subtitle.

4. The method of storing subtitles of claim 1, further comprising the step of writing a table of contents on a contiguous area of said record medium preceding the encoded video data that stores said address for assisting retrieval of said subtitle during playback.

5. The method of storing subtitles of claim 1, further comprising the step of writing, on said record medium, a stream map pointing to said bit streams on said record medium for assisting retrieval of said subtitle during playback.

6. The method of storing subtitles of claim 1, further comprising the step of writing said address as one of said bit streams of subtitle data on said record medium.

7. An apparatus for storing subtitles composed of bit streams of subtitle data on a record medium having sectors arranged by address, said subtitles being stored with encoded video data constituting a video picture composed of a series of video images, comprising:
    means for writing a subtitle to be displayed with said video images on the record medium at an address;
    means for writing said address on said record medium in an area reserved for addresses of the record medium;
    means for a encoding display time information, wherein said display time information determines the length of time said subtitle is to be displayed regardless of the number of video frames played back;
    means for writing said display time information on said record medium in an area reserved for the display time information of the record medium;
    means for encoding a color look-up table referred to during encoding a subtitle to be displayed with said video images on the record medium; and
    means for writing said color look-up table on said recording medium.

8. The apparatus of claim 7, wherein the means for writing a subtitle writes the subtitle on said record medium as a page of bit streams of subtitle data beginning with a page header portion at said address.

9. The apparatus of claim 8, wherein the means for writing a subtitle writes said display time information within said page header portion indicating a display time for displaying the subtitle.

10. The apparatus of claim 7, wherein said means for writing said address further comprises means for writing a table of contents of the address on a contiguous area of said record medium preceding the encoded video data for assisting retrieval of said subtitle during playback.

11. The apparatus of claim 7, wherein said means for writing said address further comprises stream mapping means for writing, on said record medium, a stream map pointing to said bit streams on said record medium for assisting retrieval of said subtitle during playback.

12. The apparatus of claim 7, wherein the means for writing said address writes the address as one of said bit streams of subtitle data on said record medium.

13. A computer-readable memory comprising:
    a subtitle to be displayed with video images on the computer-readable memory;
    an address pointing to said subtitle recorded on said computer-readable memory on an area reserved for addresses;
    a display time information recorded on the computer readable memory, wherein said display time information determines the length of time said subtitle is to be displayed regardless of the number of video frames played back; and
    a color look-up table referred to during decoding a subtitle to be displayed with said video images on the computer readable memory.

14. The computer-readable memory of claim 13, wherein said computer-readable memory is a digital video disc.

15. A method of receiving subtitles composed of bit streams of subtitle data stored on a record medium having sectors arranged by address, said subtitles being recorded with encoded video data constituting a video picture composed of a series of video images, comprising the steps of:
    reading out a subtitle address stored on said record medium pointing to a subtitle to be displayed;
    reading out said subtitle stored on said record medium at said subtitle address;
    reading out a color look-up table referred to during decoding a subtitle to be displayed with said video images on the record medium;
    reading out a display time information, wherein said display time information determines the length of time said subtitle is displayed regardless of the number of video frames played back; and
    decoding said subtitle for display with a respective video image.

16. The method of claim 15, wherein said display time information indicates a duration in which said subtitle is to be displayed in said respective video image, and further comprising the step of varying said duration for different playback speeds of the video picture such that said subtitle is displayed for a time determined by a particular playback speed.

17. The method of claim 15, further comprising the step of reading out the subtitle to be displayed stored on said record medium as a page of bit streams of subtitle data beginning with a page header portion positioned at said subtitle address on the record medium.

18. The method of claim 15, further comprising the step of reading a table of contents stored on said record medium in a contiguous area of said record medium preceding the encoded video data that stores said address of the subtitle to be displayed for assisting retrieval of said subtitle.

19. The method of claim 15, further comprising the step of reading, from said record medium, a stream map pointing to said bit streams stored on said record medium representing said subtitle for assisting retrieval of said subtitle during decoding.

20. The method of claim 15, further comprising the steps of:
    reading said subtitle address stored on said record medium from one of said bit streams of subtitle data; and
    decoding said subtitle address read from said record medium as video encoded data for assisting retrieval of said subtitle.

21. An apparatus for recovering subtitles composed of bit streams of subtitle data from a record medium having sectors arranged by address, said subtitles being recorded with encoded video data constituting a video picture composed of a series of video images, comprising:

means for reading, from said record medium, a subtitle address pointing to a subtitle to be displayed exclusively with a respective video image and for reading said subtitle at said subtitle address;

means for reading a display time information from said record medium in an area reserved for the display time information of the record medium;

means for decoding said display time information, wherein said display time information determines the length of time said subtitle is displayed regardless of the number of video frames played back; and means for reading out a color look-up table referred to during decoding a subtitle to be displayed with said video images on the record medium.

22. The apparatus of claim 21, further comprising:

means for reading out said display time information stored on said record medium indicating a duration in which the subtitle is to be displayed in a video image; and means for varying said duration for different playback speeds of the video picture such that said subtitle is displayed for a time determined by a particular playback speed.

23. The apparatus of claim 22, wherein said means for varying is a multiplier which multiplies said display time information by a factor for varying said duration.

24. The apparatus of claim 23, wherein said factor is the inverse of twice the particular playback speed such that the duration is sped-up as a function of the playback speed.

25. The apparatus of claim 21, further comprising means for reading the subtitle for display stored on said record medium as a page of bit streams of subtitle data beginning with a page header portion positioned at said subtitle address on the record medium.

26. The apparatus of claim 21, wherein said means for reading said subtitle address further reads a table of contents stored in a contiguous area of said record medium preceding the encoded video data which stores addresses of the subtitles to assist retrieval of said subtitle.

27. The apparatus of claim 21, wherein said means for reading said subtitle address further reads, from a stream map stored on the record medium, the address of the subtitle on the record medium for assisting retrieval of said subtitle.

28. The apparatus of claim 21, wherein said means for reading said subtitle address further reads said subtitle address as one of said bit streams of subtitle data from said record medium.

29. The apparatus of claim 28, further comprising a controller for driving a pick up to a sector of said subtitle address and for retrieving said subtitle from said record medium positioned at said subtitle address.

* * * * *